US009032158B2

(12) United States Patent
Ross

(10) Patent No.: US 9,032,158 B2
(45) Date of Patent: May 12, 2015

(54) METHOD, SYSTEM AND APPARATUS FOR IDENTIFYING A CACHE LINE

(75) Inventor: David Charles Ross, Pyrmont (AU)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 13/094,432

(22) Filed: Apr. 26, 2011

(65) Prior Publication Data

US 2011/0271058 A1   Nov. 3, 2011

(30) Foreign Application Priority Data

Apr. 29, 2010   (AU) ................................ 2010201718

(51) Int. Cl.
G06F 12/02 (2006.01)
G06F 9/54 (2006.01)

(52) U.S. Cl.
CPC ................ G06F 12/02 (2013.01); G06F 9/544 (2013.01)

(58) Field of Classification Search
USPC .................................................. 711/130–137
See application file for complete search history.

(56) References Cited

U.S. PATENT DOCUMENTS

| 5,526,506 | A  | * | 6/1996  | Hyatt ............................ 711/111 |
| 5,602,999 | A  | * | 2/1997  | Hyatt ................................ 711/1 |
| 5,682,500 | A  | * | 10/1997 | Vishlitzky et al. ............. 711/113 |
| 5,809,524 | A  | * | 9/1998  | Singh et al. .................... 711/118 |
| 5,848,433 | A  | * | 12/1998 | Tran et al. ...................... 711/137 |
| 5,860,104 | A  | * | 1/1999  | Witt et al. ...................... 711/137 |
| 5,943,687 | A  | * | 8/1999  | Liedberg ........................ 711/156 |
| 6,253,289 | B1 | * | 6/2001  | Bates et al. .................... 711/137 |
| 6,301,641 | B1 | * | 10/2001 | Verhoeven et al. ........... 711/118 |
| 6,393,525 | B1 |   | 5/2002  | Wilkerson |
| 6,425,055 | B1 | * | 7/2002  | Sager et al. .................... 711/118 |
| 6,557,089 | B1 | * | 4/2003  | Reed et al. ..................... 711/162 |
| 6,640,285 | B1 | * | 10/2003 | Bopardikar et al. ........... 711/133 |
| 6,675,263 | B2 | * | 1/2004  | Anderson et al. ............. 711/137 |
| 6,748,492 | B1 | * | 6/2004  | Rowlands et al. ............. 711/128 |
| 6,748,496 | B1 | * | 6/2004  | Scarpino ........................ 711/137 |
| 6,772,302 | B1 | * | 8/2004  | Thompson ..................... 711/162 |
| 6,820,170 | B1 | * | 11/2004 | Elnathan et al. .............. 711/108 |
| 6,876,589 | B2 | * | 4/2005  | LaBerge ........................ 365/200 |
| 6,957,304 | B2 | * | 10/2005 | Wilkerson ..................... 711/137 |
| 6,990,557 | B2 | * | 1/2006  | Hokenek et al. .............. 711/133 |
| 7,155,572 | B2 | * | 12/2006 | Hughes et al. ................ 711/122 |
| 7,191,304 | B1 | * | 3/2007  | Cameron et al. .............. 711/202 |
| 7,310,705 | B2 | * | 12/2007 | Yoshida et al. ............... 711/122 |
| 7,376,676 | B2 | * | 5/2008  | Blea et al. ............................ 1/1 |
| 7,467,268 | B2 | * | 12/2008 | Lindemann et al. .......... 711/162 |
| 7,548,982 | B2 | * | 6/2009  | Gu et al. ........................ 709/228 |
| 7,571,292 | B2 | * | 8/2009  | McClure ........................ 711/162 |
| 7,577,793 | B2 | * | 8/2009  | Borkenhagen et al. ....... 711/133 |
| 7,716,332 | B1 | * | 5/2010  | Topfl et al. .................... 709/226 |
| 7,774,549 | B2 | * | 8/2010  | Vishin ........................... 711/133 |

(Continued)

Primary Examiner — Arpan P. Savla
Assistant Examiner — Mohamed Gebril
(74) Attorney, Agent, or Firm — Canon U.S.A., Inc. IP Division

(57) ABSTRACT

A method of identifying a cache line of a cache memory (180) for replacement, is disclosed. Each cache line in the cache memory has a stored sequence number and a stored transaction data stream identifying label. A request (e.g., 400) associated with a label identifying a transaction data stream is received. The label corresponds to the stored transaction data stream identifying label of the cache line. The stored sequence number of the cache line is compared with a response sequence number. The response sequence number is associated with the stored transaction data stream identifying label of the cache line. The cache line is identified for replacement based on the comparison.

10 Claims, 22 Drawing Sheets

(56) References Cited

U.S. PATENT DOCUMENTS

| | | | |
|---|---|---|---|
| 7,836,260 B2 * | 11/2010 | Gara et al. | 711/137 |
| 7,917,701 B2 * | 3/2011 | Charra et al. | 711/137 |
| 7,930,485 B2 * | 4/2011 | Fertig et al. | 711/137 |
| 7,930,496 B2 * | 4/2011 | Kubo et al. | 711/162 |
| 7,958,311 B2 * | 6/2011 | Matick et al. | 711/134 |
| 7,979,642 B2 * | 7/2011 | Bull et al. | 711/133 |
| 8,041,897 B2 * | 10/2011 | Biles et al. | 711/133 |
| 8,078,806 B2 * | 12/2011 | Diefendorff | 711/137 |
| 8,095,754 B2 * | 1/2012 | McBride et al. | 711/162 |
| 8,095,755 B2 * | 1/2012 | Ashour et al. | 711/162 |
| 8,185,703 B2 * | 5/2012 | Marlan et al. | 711/150 |
| 8,190,824 B2 * | 5/2012 | Shen et al. | 711/133 |
| 8,230,185 B2 * | 7/2012 | Agombar et al. | 711/162 |
| 8,281,093 B1 * | 10/2012 | Krishnan et al. | 711/162 |
| 8,356,150 B2 * | 1/2013 | Fachan et al. | 711/162 |
| 8,364,900 B2 * | 1/2013 | Caprioli et al. | 711/136 |
| 8,504,411 B1 * | 8/2013 | Subasic et al. | 705/7.33 |
| 8,676,741 B2 * | 3/2014 | Ulinski et al. | 706/52 |
| 2001/0001873 A1 * | 5/2001 | Wickeraad et al. | 711/136 |
| 2002/0040421 A1 * | 4/2002 | Muta | 711/125 |
| 2004/0006664 A1 * | 1/2004 | Helzer et al. | 711/5 |
| 2004/0083341 A1 * | 4/2004 | Robinson et al. | 711/133 |
| 2004/0128618 A1 * | 7/2004 | Datta | 715/513 |
| 2004/0260902 A1 * | 12/2004 | Stanley et al. | 711/165 |
| 2005/0055506 A1 | 3/2005 | DeMent | |
| 2005/0071708 A1 * | 3/2005 | Bartfai et al. | 714/5 |
| 2006/0015696 A1 * | 1/2006 | Nguyen et al. | 711/162 |
| 2006/0026377 A1 * | 2/2006 | Sikdar et al. | 711/170 |
| 2006/0059311 A1 * | 3/2006 | Van De Waerdt et al. | 711/137 |
| 2006/0143396 A1 * | 6/2006 | Cabot | 711/134 |
| 2008/0084769 A1 * | 4/2008 | RaghuRam et al. | 365/191 |
| 2008/0155226 A1 * | 6/2008 | Davis et al. | 711/207 |
| 2008/0189482 A1 * | 8/2008 | Fuente | 711/112 |
| 2008/0288863 A1 * | 11/2008 | Bohannon | 715/255 |
| 2010/0088468 A1 * | 4/2010 | Agombar et al. | 711/112 |
| 2010/0153653 A1 * | 6/2010 | El-Mahdy et al. | 711/137 |
| 2010/0235584 A1 * | 9/2010 | Guthrie et al. | 711/135 |
| 2010/0274972 A1 * | 10/2010 | Babayan et al. | 711/125 |
| 2011/0055488 A1 * | 3/2011 | Vishin | 711/133 |
| 2011/0208932 A1 * | 8/2011 | Agombar et al. | 711/162 |
| 2011/0296127 A1 * | 12/2011 | Agombar et al. | 711/162 |
| 2012/0047317 A1 * | 2/2012 | Yoon et al. | 711/103 |
| 2012/0198153 A1 * | 8/2012 | Fuente et al. | 711/114 |
| 2012/0221774 A1 * | 8/2012 | Atkisson et al. | 711/103 |
| 2012/0221787 A1 * | 8/2012 | Fuente et al. | 711/112 |
| 2012/0331264 A1 * | 12/2012 | Farrell et al. | 711/207 |
| 2013/0086302 A1 * | 4/2013 | Tressler et al. | 711/103 |

* cited by examiner

METHOD, SYSTEM AND APPARATUS FOR IDENTIFYING A CACHE LINE

REFERENCE TO RELATED PATENT APPLICATION(S)

This application claims the benefit under 35 U.S.C. §119 of the filing date of Australian Patent Application No. 2010201718, filed 29 Apr. 2010, hereby incorporated by reference in its entirety as if fully set forth herein.

FIELD OF INVENTION

The present invention relates to cache line replacement and, in particular, to a method and apparatus for replacing data stored within a cache line of a cache memory. The present invention also relates to a computer program product including a computer readable medium having recorded thereon a computer program for replacing data stored within a cache line of a cache memory.

DESCRIPTION OF BACKGROUND ART

Conventional computer systems often include on-chip or off-chip cache memories (or caches) that are used to speed up accesses to system memory (or main memory). In a shared memory multiprocessor system, a cache memory (or cache) may also be shared. Typically, such a cache is referred to as a level-two cache, where dedicated level-one cache memories may be assigned to individual processors. The level-two cache memory commonly sits between the level-one cache memories and main memory. A level-one cache memory provides relatively low capacity, but fast access to an associated dedicated processor. A level-two cache memory services level-one cache misses (i.e., a failed attempt to read or write a piece of data in the cache) with somewhat increased latency, but offers substantially more capacity. Main memory, on the other hand, provides mass storage at the expense of greatly extended latency.

When a level-one cache memory misses, the associated dedicated processor may stall. From a system-level perspective such a stall may be tolerable since not all processors are idle for the duration of an idle period. However, stalls in a level-two cache memory have a bigger impact on system-level performance because all processors may be affected. Therefore measures may be taken to avoid, or minimise, conditions leading to a level-two cache memory stall. For example, when a cache miss occurs, the level-two cache memory may be configured to access main memory to fill a cache line. If a subsequent cache hit occurs (i.e., a successful attempt to read or write a piece of data in the cache) to the same cache line, the cache memory has no way to process the hit until the cache line is filled. To avoid stalling, the cache memory may buffer the hit until such time as the cache line is filled thereby allowing subsequent accesses to be processed.

A cache memory is subdivided into sets of cache lines. When each set contains just one cache line, each main memory line may be stored in just one location within the cache memory. Such a cache memory is referred to as a direct mapped cache memory. More typically, each set contains a number of cache lines. Each main memory line maps to a set and may therefore be stored in any of the cache lines (or ways) within the set. The method used for deciding which line in the set is to be replaced after a cache miss is called a "replacement policy". One known method is to identify a least-recently-used cache line as the replacement, or "victim", cache line. However, because a cache memory may buffer transactions that cannot be processed immediately, simple replacement methods may be inadequate. Steps need to be taken to ensure that any outstanding accesses to victim cache lines are completed before the victim cache line is replaced.

Thus a need clearly exists for an improved method of replacing data stored within a cache line, which avoids stalling dedicated processors.

SUMMARY OF THE INVENTION

It is an object of the present invention to substantially overcome, or at least ameliorate, one or more disadvantages of existing arrangements.

According to one aspect of the present disclosure there is provided a method of allocating a cache line of a cache memory, said method comprising:

receiving a request from a process executed by a processor, said request having a source identifier identifying the process;

assigning the value of a request sequence number register to the request, the value of the request sequence number register being associated with the source identifier of the request;

incrementing the value of the request sequence number register;

determining a set of candidate victim cache lines in the cache memory, each cache line having a set of identifiers comprising a stored sequence number and a stored source identifier, the set of identifiers for each cache line being set to a request sequence number and a source identifier associated with a most recently processed request which accessed that cache line;

comparing the stored sequence number of at least one of said candidate victim cache lines from the set of candidate victim cache lines with the value of a response sequence number register, said response sequence number register being pointed to by the stored source identifier;

identifying a cache line of said set of candidate victim cache lines, said identified cache line having a stored sequence number that is less than or equal to the value of said response sequence number register; and allocating the identified cache line to the request from the process executed by the processor.

According to another aspect of the present disclosure there is provided an apparatus for allocating a cache line of a cache memory, said apparatus comprising:

means for receiving a request from a process executed by a processor, said request having a source identifier identifying the process;

means for assigning the value of a request sequence number register to the request, the value of the request sequence number register being associated with the source identifier of the request;

means for incrementing the value of the request sequence number register;

means for determining a set of candidate victim cache lines in the cache memory, each cache line having a set of identifiers comprising a stored sequence number and a stored source identifier, the set of identifiers for each cache line being set to a request sequence number and a source identifier associated with a most recently processed request which accessed that cache line;

means for comparing the stored sequence number of at least one of said candidate victim cache lines from the set of candidate victim cache lines with the value of a response sequence number register, said response sequence number register being pointed to by the stored source identifier; and means for identifying a cache line of said set of candidate victim cache lines, said identified cache line having a stored sequence number which is less than or equal to the value of the response sequence number register: and means for allocating the identified cache line to the request from the process executed by the processor.

According to still another aspect of the present disclosure there is provided a system for identifying a cache line of a cache memory for replacement, each cache line in the cache memory having a stored sequence number and a stored transaction data stream identifying label, said system comprising:

a memory storing data and a computer program; and a processor coupled to said memory for executing said computer program, said computer program comprising instructions for:

receiving a request from a process executed by a processor, said request having a source identifier identifying the process;

assigning the value of a request sequence number register to the request, the value of the request sequence number register being associated with the source identifier of the request;

incrementing the value of the request sequence number register;

determining a set of candidate victim cache lines in the cache memory, each cache line having a set of identifiers comprising a stored sequence number and a stored source identifier, the set of identifiers for each cache line being set to a request sequence number and a source identifier associated with a most recently processed request which accessed that cache line;

comparing the stored sequence number of at least one of said candidate victim cache lines from said set of candidate victim cache lines with the value of a response sequence number register, said response sequence number register being pointed to by the stored source identifier;

identifying a cache line of said set of candidate victim cache lines, said identified cache line having a stored sequence number which is less than the compared response sequence number; and allocating the identified cache line to the request from the process executed by the processor.

According to still another aspect of the present disclosure a computer readable medium having a computer program recorded thereon for identifying a cache line of a cache memory for replacement, each cache line in the cache memory having a stored sequence number and a stored transaction data stream identifying label, said program comprising:

code for receiving a request from a process executed by a processor, said request having a source identifier identifying the process;

code for assigning the value of a request sequence number register to the request, the value of the request sequence number register being associated with the source identifier of the request;

code for incrementing the value of the request sequence number register;

code for determining a set of candidate victim cache lines in the cache memory, each cache line having a set of identifiers comprising a stored sequence number and a stored source identifier, the set of identifiers for each cache line being set to a request sequence number and a source identifier associated with a most recently processed request which accessed that cache line;

code for comparing the stored sequence number of at least one of said candidate victim cache lines from the set of candidate victim cache lines with the value of a response sequence number register, said response sequence number register being pointed to by the stored source identifier;

code for identifying a cache line of said set of candidate victim cache lines, said identified cache line having a stored sequence number that is less than or equal to the value of said response sequence number register; and code for allocating the identified cache line to the request from the process executed by the processor.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1A:
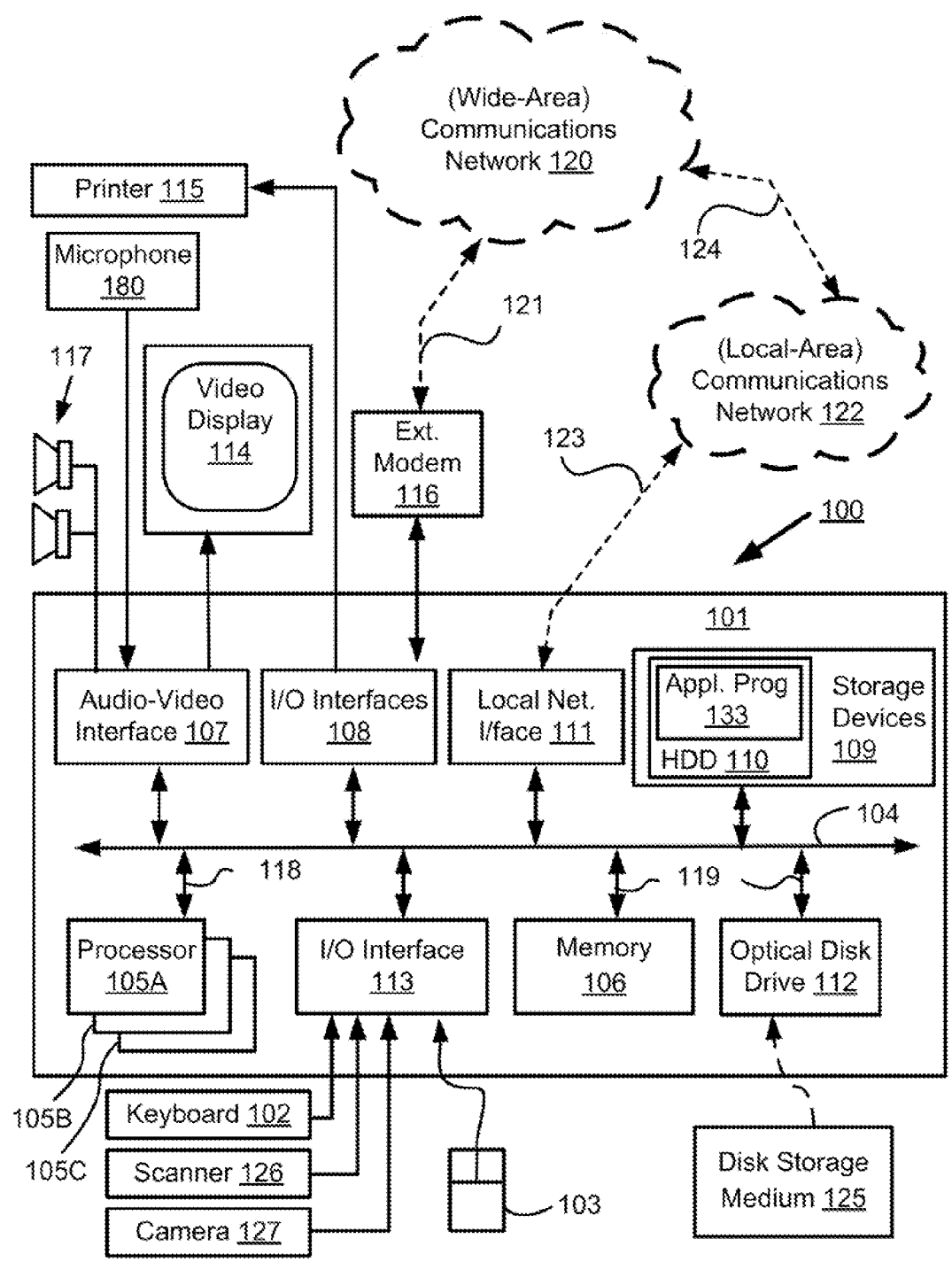
FIG. 1A is a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

A method 300 of replacing data stored within a cache line of a cache memory will be described in detail below with reference to FIGS. 1 to 19. As described in detail below, the cache line is identified for replacement, from a set of cache lines, based on a comparison of sequence numbers associated with the cache lines. The method 300 is particularly advantageous for a cache memory shared by multiple processors.

FIG. 1A shows a general-purpose computer system 100, upon which the various arrangements described can be practiced. As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes processor units 105A, 105B and 105C, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105A, 105B and 105C to 113 of the computer module 101 typically communicate via an interconnected bus 104 and in a manner that results in a conventional mode of operation of the computer system 100 known to those in the relevant art. For example, the processors 105A, 105B and 105C are coupled to the system bus 104 using connections (e.g., 118). Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

The method 300 may be implemented using the computer system 100 wherein the processes of FIGS. 2 to 18 to be described, may be implemented as one or more software application programs 133 executable within the computer system 100. In particular, the steps of the method 300 are effected by instructions in the software 133 that are carried out within the computer system 100. The software instructions may be formed as one or more code modules, each for performing one or more particular tasks. The software may also be divided into two separate parts, in which a first part and the corresponding code modules performs the method 300 and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the method 300.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180. The method 300 may alternatively be implemented in dedicated hardware such as one or more integrated circuits performing the functions or sub functions of the method 300. Such dedicated hardware may include graphic processors, digital signal processors, or one or more microprocessors and associated memories.

Figure 1B:
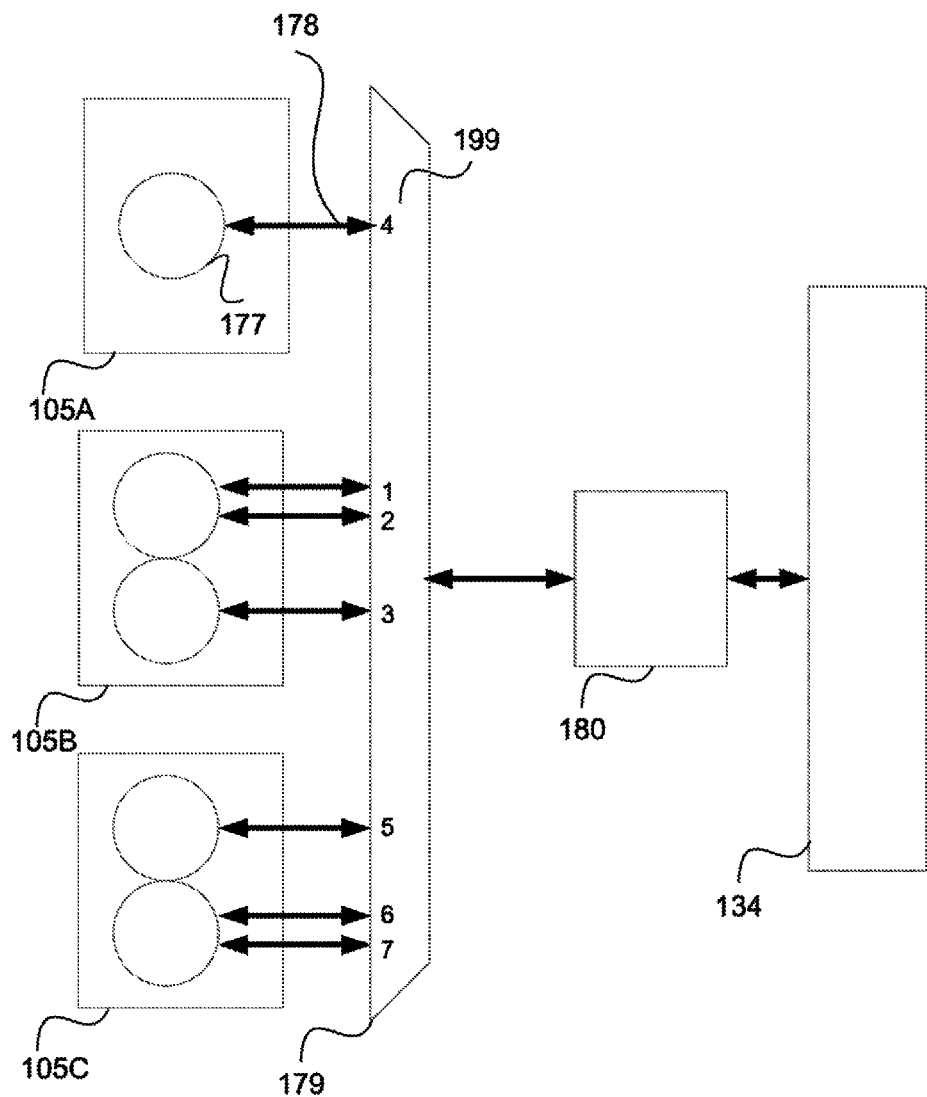
FIG. 1B shows the processors of FIG. 1A according to one data processing example.

FIG. 1B shows the processors 105A, 105B, 105C in further detail. Each processor 105A, 105B and 105C may be engaged in one or more processes or threads (e.g., 177). Each thread (e.g., 177) may communicate with a cache memory 180, configured within a portion of the memory 106, via one-or-more memory transaction data streams (e.g., 178). In one example, each of the transaction data streams 178 is physically separated and multiplexed by multiplexer 179 into request ports of cache memory 180. Alternatively, transactions data streams may be logically differentiated by an identifier referred to as a SourceID (e.g., 199), which is a transaction data stream identifying label.

The SourceIDs may be attached to transaction data streams by a respective initiating thread (e.g., 177), or by their host processor 105A, 105B or 105C. However, in the example of FIG. 1B, the SourceIDs are attached to each transaction data stream by the multiplexer 179. As such, the processors 105A to 105C need not be concerned with attaching the SourceIDs to transaction data streams and thus the cache memory 180 is interoperable with other configurations of the computer system 100.

Figure 2:
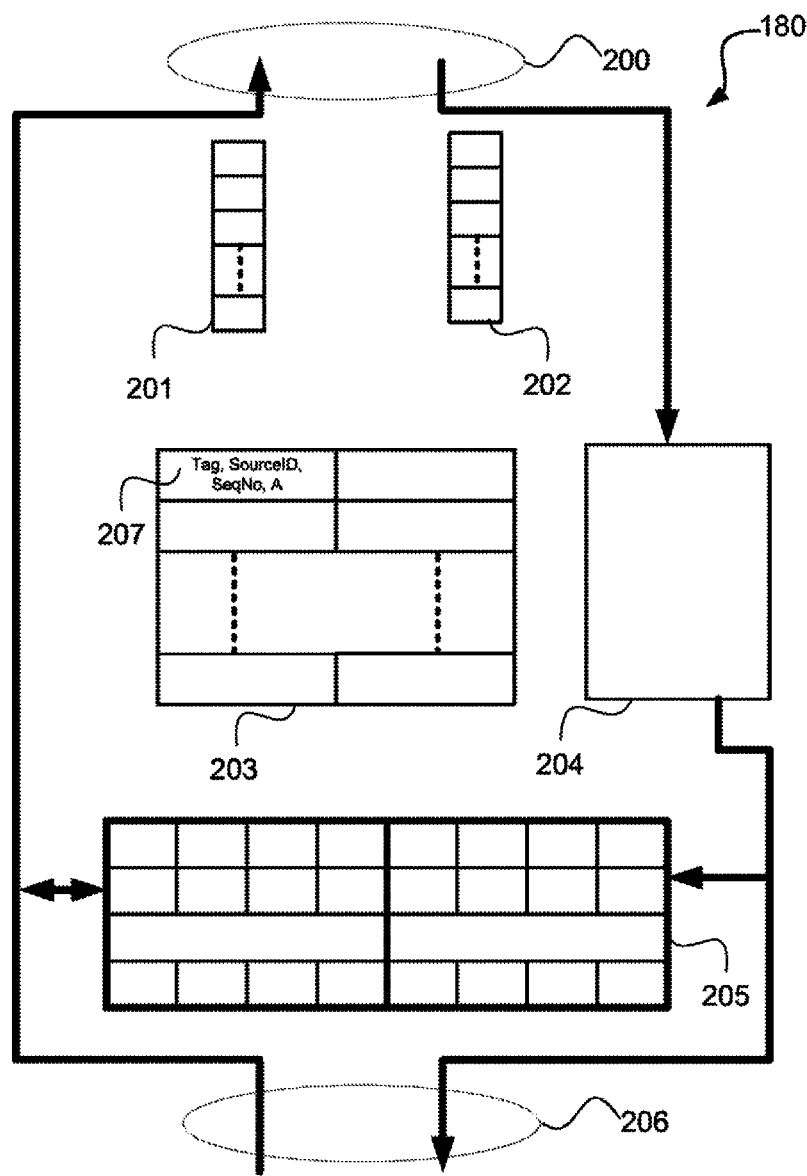
FIG. 2 shows an example architecture for a cache memory.

FIG. 2 shows an example architecture for the cache memory 180. The cache memory 180 as shown in FIG. 2 is a two-way associative cache. As seen in FIG. 2, the cache memory 180 comprises a request/response interface 200. The cache memory 180 receives requests for memory access from the processors 105A, 105B and 105C on the interface 200. The cache memory 180 services requests received on the request/response interface 200 returning requested data in a response on the request/response interface 200. A request may be defined as a single transaction within a transaction data stream (e.g., 178) serviced by the cache memory 180. A response may similarly be defined as a single transaction within a transaction data stream returned from the cache memory 180 to the processors 105A, 105B or 105C.

Two sequence number arrays (or registers) 201, 202 maintain data pertaining to position of each request/response within a transaction data stream (e.g., 178). The sequence number arrays 201, 202 are indexed by a transaction data stream identifying label or SourceID 199. For example, the SourceID 199 is "4". Therefore, each transaction data stream has a dedicated pair of sequence numbers indexed by the transaction data stream SourceID.

The request sequence number array (or register) 202 is associated with requests sent by the processors 105A, 105B or 105C and received by the cache memory 180. The response sequence number array 201 is associated with transactions returned from the cache memory 180 to the processors 105A, 105B or 105C. As each request is processed, the sequence number within the request sequence number array 202, indexed by the SourceID of the request, is incremented. As each response is processed, the sequence number within the response sequence number array 201, indexed by the transaction data stream identifying label or SourceID (e.g., 199) of the response, is incremented.

The cache memory 180 comprises a registry 203 containing status data elements pertaining to each cache line within the cache memory 180. Each status data element of the registry 203 is associated with a cache line. Cache lines, in turn, are elements of cache line array 205. The status data held in each status data element of the registry 203 comprises the following items:

a tag;
transaction data stream identifying label or SourceID of a last request to access the associated cache line;
sequence number (SeqNo) of the last request to access the associated cache line; and
age (L) of the cache line within the set.

A main memory interface 206 is used by the cache memory 180 to access data from another portion of the memory 106/134 and/or from the hard disk drive 110. The portion of the memory 106 not containing the cache memory 180 may be referred to as "main memory". Similarly, the hard disk drive 110 may be referred to as "main memory".

A cache controller 204, under execution of one or more of the processors 105A, 105B or 105C (the cache controller can also operate independently of the processors), coordinates operation of the components 201 to 205 of the cache memory 180. Each of the components 201 to 205 of the cache memory 180 may be implemented as one or more software modules resident on the hard disk drive 110 and being controlled in their execution by one or more of the processors 105A, 105B and 105C. The components 201 to 205 of the cache memory 180 may alternatively be implemented in dedicated hardware such as one or more integrated circuits performing the functions or sub functions of the components 201 to 205. In the exemplary embodiment of the invention, the cache is implemented as a core resident on a System-On-Chip (SOC).

The cache memory 180 of FIG. 2 is organised as a two-way associative cache. Therefore, indexing into the registry 203, using cache index 1, returns two cache lines (or ways) collectively referred to as a "set". The age (L) of each cache line within a set (i.e., a set of cache lines) may assume one of two values, as follows:

0—youngest (or most-recently-used) cache line within the set.
1—oldest (or least-recently used) cache line within the set.

Figure 3:
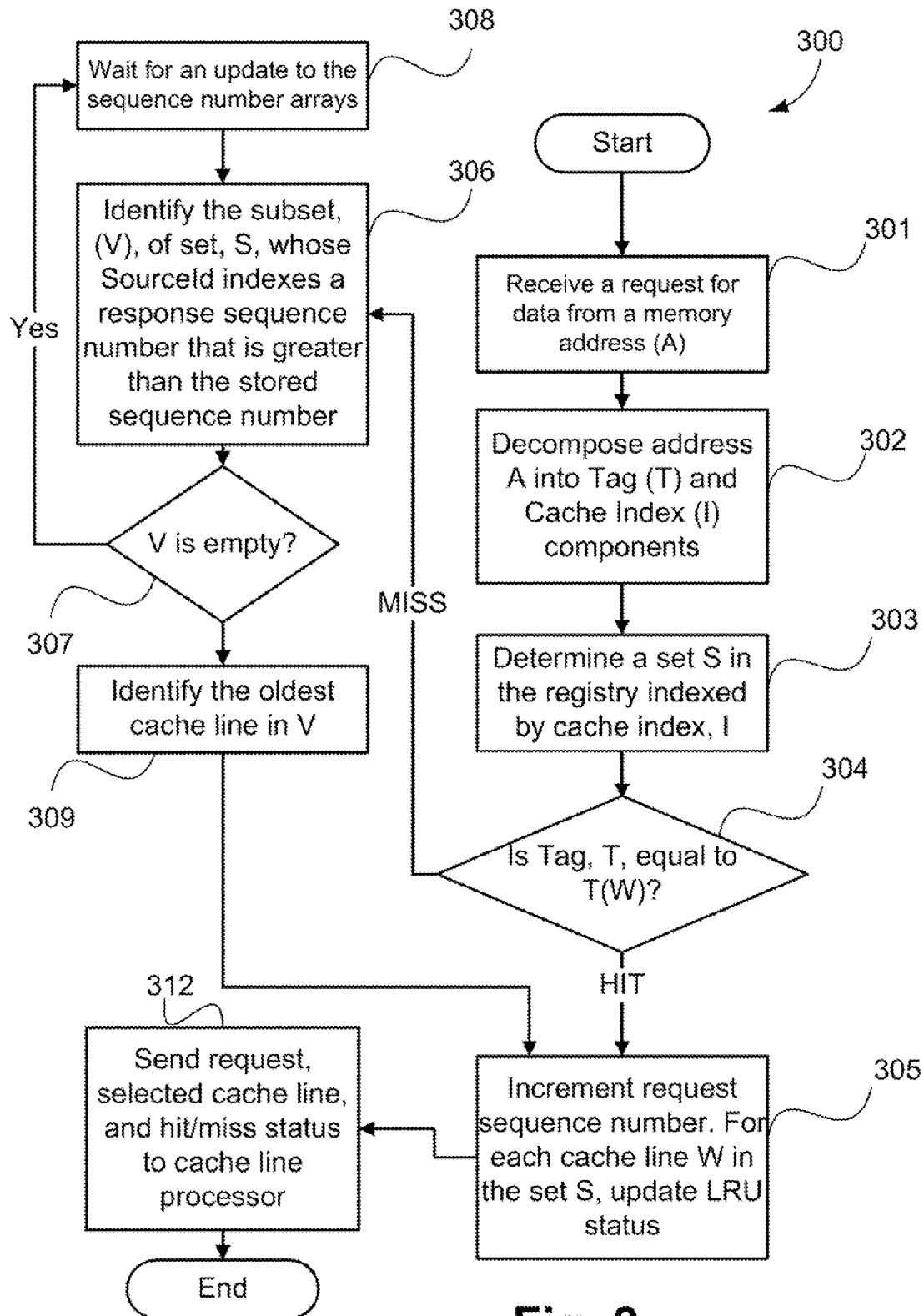
FIG. 3 is a flow diagram showing a method of replacing data stored within a cache line of the cache memory of FIG. 2.

The method 300 of replacing data stored within a cache line of a cache memory will now be described in detail with reference to FIG. 3. The method 300 will be described with reference to the cache memory 180. The method 300 may be implemented as software resident on the hard disk drive 110 and being controlled in its execution by the cache controller 204. As described above, the cache controller 204 may be under execution of one or more of the processors 105A, 105B and/or 105C. In accordance with the method 300, the cache controller 204 performs steps for allocating a cache line of the cache memory 180 depending on requests received from processes being executed, for example, by the processor 105A, 105B and 105C. The allocated cache line is identified for replacement, from a set of cache lines, based on a comparison of sequence numbers associated with the cache lines.

The method 300 begins at step 301, when the cache controller 204 performs the step of receiving a request on the request/response interface 200. The request may be received from a process or thread (e.g, 177) executed by one of the processors 105A, 105B and 105C. The request comprises an address A of a location within the memory 106 or the hard disk drive 110 to be accessed. The request also comprises a transaction stream identifying label or source identifier (SourceID) 199 identifying the thread (or process).

At the next step 302, the cache controller 204 decomposes the address, A; into two components, or slices; namely a tag T and cache index 1. Typically, the tag, T, comprises an upper portion of the address, A, and the cache index, 1, comprises a lower portion of the address, A.

At step 303, the cache controller 204 performs the step of determining a set S of candidate victim cache lines, in the cached memory 180, associated with the request. The set, S, is determined by indexing into the registry 203 using the cache index, I. Each of the cache lines of the set, S, has a set of identifiers including a tag, a stored sequence number and a stored transaction data stream identifying label or source identifier (i.e., SourceID). The set of identifiers associated with each cache line is set to a request sequence number and a source identifier (SourceID) associated with a most recently processed request that accessed that cache line.

Then at step 304, the cache controller 204 compares a tag stored in each of the candidate victim cache lines of the set, S, with the tag, T, of the request received at step 301. If any of the tags in the set, S, match the tag, T, in the received request, then data associated with the request is present in the cache memory 180 and the request is said to be a hit (HIT). As the request is a hit, the method 300 proceeds to step 305. Otherwise, the request is said to miss (MISS) and the method 300 proceeds to step 306.

If the request is a miss (MISS), the cache controller 204 needs to perform the step of allocating an identified cache line to the request from the process as received at step 301. Generally, the allocation of the cache line may be performed by evicting an existing cache line from the cache memory 180. However, cache lines that have outstanding unprocessed requests cannot be safely evicted from the cache memory 180. In the method 300, the cache controller 204 identifies those cache lines that do not have outstanding unprocessed requests and makes the cache lines available for replacement. The method 300 prevents any cache lines that do have outstanding unprocessed requests from being victimised.

At identifying step 306, the cache controller 204 performs the step of comparing the stored sequence number of at least one candidate victim cache line from the set, S, with the value of a response sequence number. As described above, the response sequence number is stored in the response sequence number array (or register) 201. The response sequence number within the response sequence number array 201 is indexed (or pointed to) by the stored transaction data stream identifying label or SourceID (e.g., 199) of the cache line. In particular, at step 306, a subset V of the selected set, S, is identified by the cache controller 204. The set V being the subset of the set S whose stored sequence numbers are less than their corresponding response sequence numbers. From the subset V, the cache controller 204 is used for identifying the Least Recently Used cache line, for replacement. In particular, the cache controller 204 identifies a cache line of the set, S, having a stored sequence number which is less than the compared response sequence number. For each cache line within the selected set, S, of the registry 203, the transaction data stream identifying label or SourceID status data element associated with the cache line is used to index the response sequence number array 201 in order to determine a response sequence number. If the response sequence number returned from the response sequence number array 201, is greater than the sequence number stored in the registry 203, then the cache line is added to the subset, V.

At the next step 307, if the subset, V, of the selected set, S, is not empty 307, then the method 300 proceeds to step 309. Otherwise, the method 300 proceeds to step 308 where the cache controller 204 waits for an update to the sequence number arrays 201, 202.

At step 309, the cache controller 204 identifies the oldest cache line in the subset, V, by identifying which cache line has been least recently used. The oldest cache line in the subset, V, corresponds to a "victim" cache line. Also at step 309, the cache controller 204 performs the step of assigning the sequence number and transaction stream identifying label (or SourceID) of the request received at step 301 to a corresponding status element within the registry 203 associated with the identified victim cache line. Accordingly, the identified cache line is allocated to the request from the process received at step 301. The sequence number and transaction stream identifying label may then be used to replace the data stored in the identified victim cache line.

As described above, as the request is determined to be a hit (i.e., HIT) at step 304, the Method 300 proceeds to step 305. At step 305, the cache controller 204 performs the step of assigning the value of a request sequence number to the request received at step 301. The request sequence number is held in the request sequence number array (or register) 202 and is associated with (or indexed by) the request source identifier (SourceID). In particular, for the two-way associative cache memory 180 as seen in FIG. 2, the age of the cache line within the selected set, S, containing a tag matching the tag, T, of the request is assigned the value zero. Further, the age of the cache line within the selected set, S, not containing a tag matching tag, T, is assigned the value one.

Step 309 may be extended to cache memories with higher associability. In the case of a hit, HIT, the request sequence number held in the request sequence number array 202 indexed by the request SourceID is copied to the cache line within the selected set, S, containing the tag matching the tag, T. In the case of a miss, MISS, the request sequence number held in the request sequence number array 202 is copied to the victim cache line.

Also at step 305, as the request received at step 301 can be processed, the cache controller 204 performs the step of incrementing the value of the request sequence number held in the request sequence number array (or register) 202 indexed by the request SourceID. In one implementation, the request sequence number is compared to the response sequence number. If the response sequence number returned from the response sequence number array 201, is equal to the request sequence number returned from the request sequence number array 202, then the cache line is added to the subset, V.

The method 300 concludes at next step 312, where the request may be dispatched downstream and the cache line array 205 may return requested data for the identified cache line of the set, S. Alternatively, the main memory (i.e., a portion of the memory 106 or the hard disk drive 110) may be accessed by the cache controller 204 to fetch data for the identified cache line of the set, S.

The method 300 may be executed again upon the cache controller 204 receiving a further request on the request/response interface 200, as at step 301. The further request may be processed in accordance with the method 300 for assigning the further request to a new sequence number and determining a further cache line that contains data associated with the further request. In accordance with the method 300, the cache controller 304 performs the step of assigning a new request sequence number to the further cache line. Upon such a further request being processed in accordance with the method 300, the further request may be dispatched downstream where the cache line array 205 may be used for returning data associated with the further request. The cache controller 204 may perform the step of incrementing the new sequence number upon returning the data associated with the further request.

The method 300 will now be described in more detail by way of example with reference to FIGS. 4 to 19.

Figure 4:
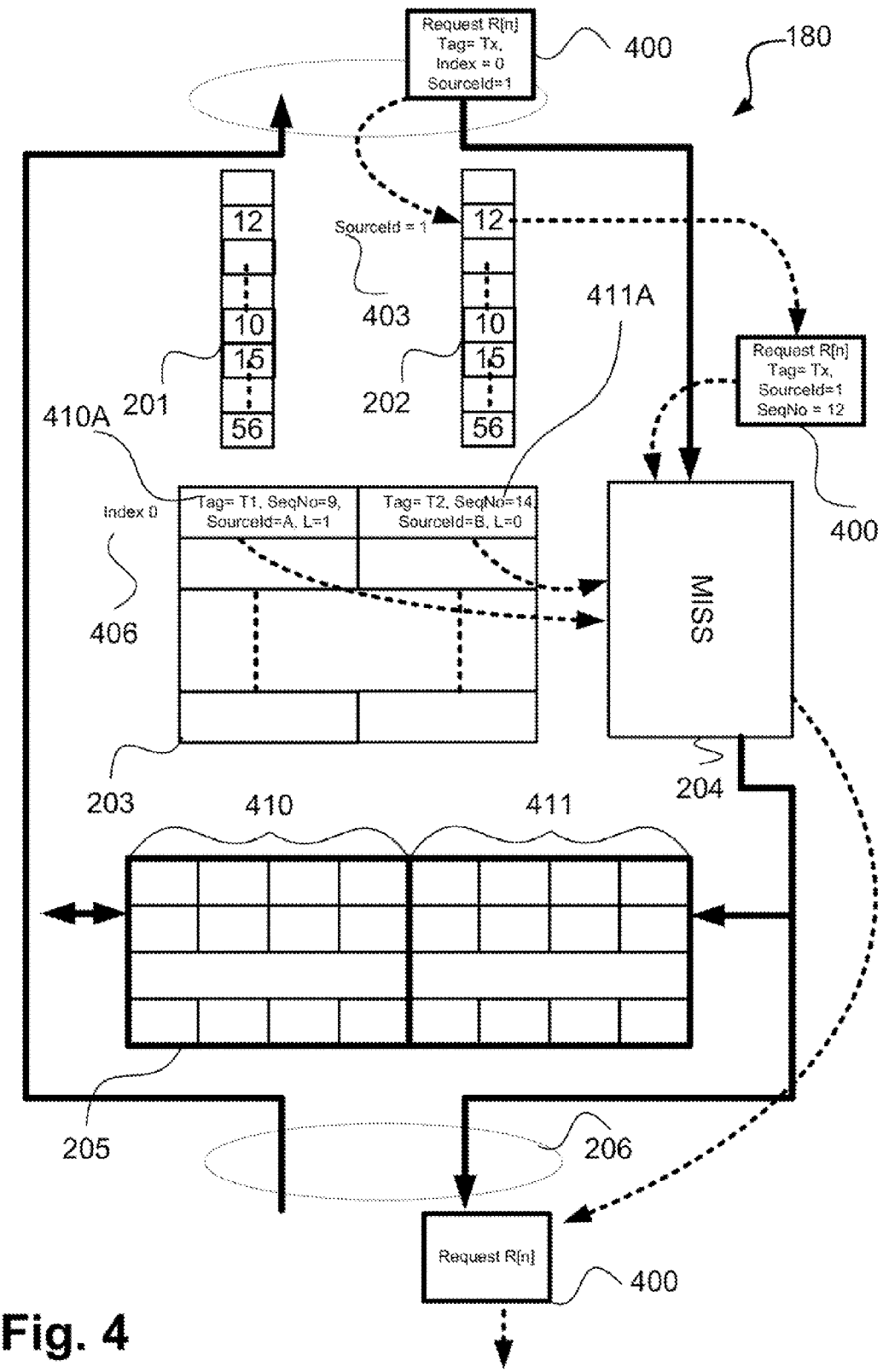
FIG. 4 is a schematic block diagram of the cache memory of FIG. 2 showing a cache miss example.

FIG. 4 shows the cache memory 180, according to the architecture of FIG. 2. In FIG. 4, the cache memory 180 has been annotated to illustrate the behaviour of the cache memory 180 during a cache miss example (i.e., MISS). In the example of FIG. 4, the cache memory 180 is responding to a memory access request R[n] 400 received by the cache controller 204 (as at step 301). In a current state, as shown in FIG. 4, the cache memory 180 has no outstanding requests. As such, at all relevant indices, the active sequence number pairs currently contained within the request sequence number array 202 and the response sequence number array 201 are equal, indicating that for every request there has been a corresponding response. The registry 203 currently contains two status data elements 410A and 411A at cache index 406 equal to zero (0) (i.e., Index=0). As seen in FIG. 4, the status data elements 410A and 411A within the registry 203 correspond to the cache lines 410 and 411, respectively, stored within the cache line array 205. The cache line array 205 may be configured within the memory 106. The two status data elements 410A and 411A contain active status data for the two cache lines 410 and cache line 411, respectively.

The request Rn 400 has a tag of Tx, a cache index of zero (0), and a transaction stream identifying label or SourceID of one (1) (i.e., SourceID=1) as seen in FIG. 4. As seen at 403 of FIG. 4, the SourceID of the request 400 is used to index the request sequence number array 202 to look-up a request sequence number for transaction stream R. The request sequence number array 202 returns a value, twelve (12). The returned value is attached to the request 400 as seen in FIG. 4. The request 400 is processed by the cache controller 204. The cache controller 204 uses cache index 406 (i.e., Index 0) to look-up the registry 203. The registry 203 returns status data for the set of cache lines at cache index 406 equal to zero (Index 0). The status element 410A, corresponding to cache line 410, contains a tag, Tag=T1. Further, the status element 411A, corresponding cache line 411, contains a tag, Tag=T2, as seen in FIG. 4.

In the example of FIG. 4, neither of the tags T1 or T2 matches the tag Tx in the request 400. The cache controller 204 then applies steps 306 to 309 of the method 300 described in FIG. 3. Using the SourceIDs (i.e., SourceID=A and SourceID=B) for each of cache line 410 and cache line 411 in the set at cache index 406 equal to zero (0) (i.e., Index 0), the cache controller 204 determines that both cache lines 410 and 411 are replaceable.

The status data element 411A of the registry 203 corresponding to cache line 411 in set 0 contains SourceID=A. The cache controller 204 uses the value SourceID=A to index into the request sequence number array 202 and the response sequence number array 201 which reveals that the stored sequence number (9) is less than the indexed response sequence number (10). Similarly, the status element 411A of the registry 203 corresponding to cache line 411 contains the SourceID=B. Indexing the sequence number arrays 201 and 202 with the value SourceID=B reveals that the stored sequence number (14) is less than the indexed response sequence number (15). Therefore, the subset V of Set 0 is identical to Set 0, so both cache line 410 and cache line 411 are replaceable.

In the example of FIG. 4, the least recently used cache line is cache line 410 and cache line 410 is thus identified as the replacement "victim". Finally, in FIG. 4 the cache controller 204 performs the step of issuing a main memory access request 400 to the main memory (i.e., memory 106 and/or the hard disk drive 110) via the main memory interface 206 to fetch data for the identified cache line 410.

Figure 5:
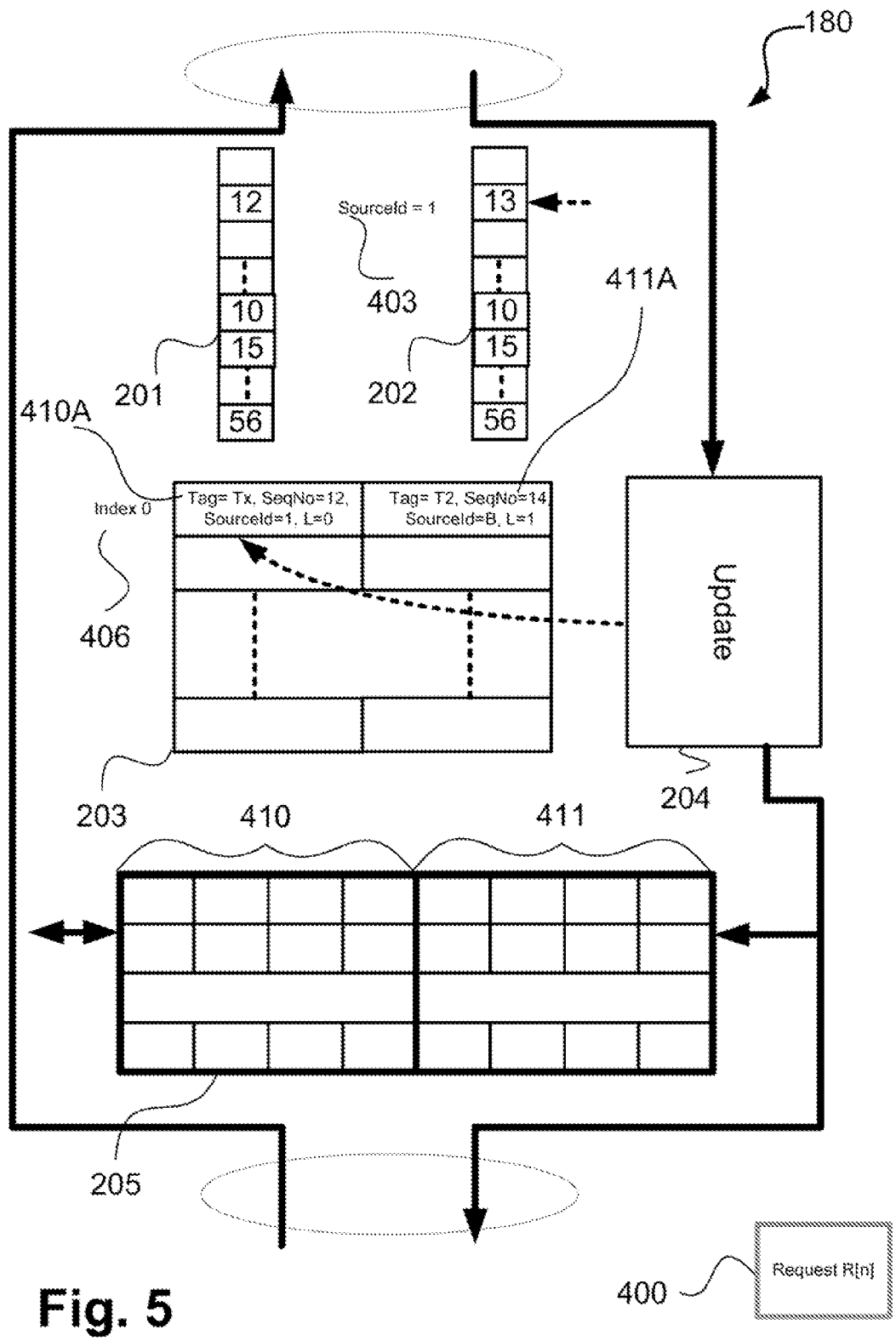
FIG. 5 is a schematic block diagram showing the state of the cache memory of FIG. 2 after request R[n] has been issued to main memory.

FIG. 5 shows the state of the cache memory 180 after the memory access request R[n] 400 has been issued to main memory (i.e., the memory 106 and/or the hard disk drive). The status data within the status data element 410A, corresponding to the victim cache line (i.e., cache line 410), in the registry 203 has been replaced by the status data of request R[n] 400. As seen in the request sequence number array 202 of FIG. 5, the request sequence number corresponding to the SourceID 403 of request R[n] 400 has been incremented from twelve (12) to thirteen (13). As also seen in FIG. 5, the sequence numbers (i.e., SeqNo) in the status data elements 410A and 411A corresponding to the transaction data stream R now differ since, as yet, there has been no response to the memory access request R[n] 400.

Figure 6:
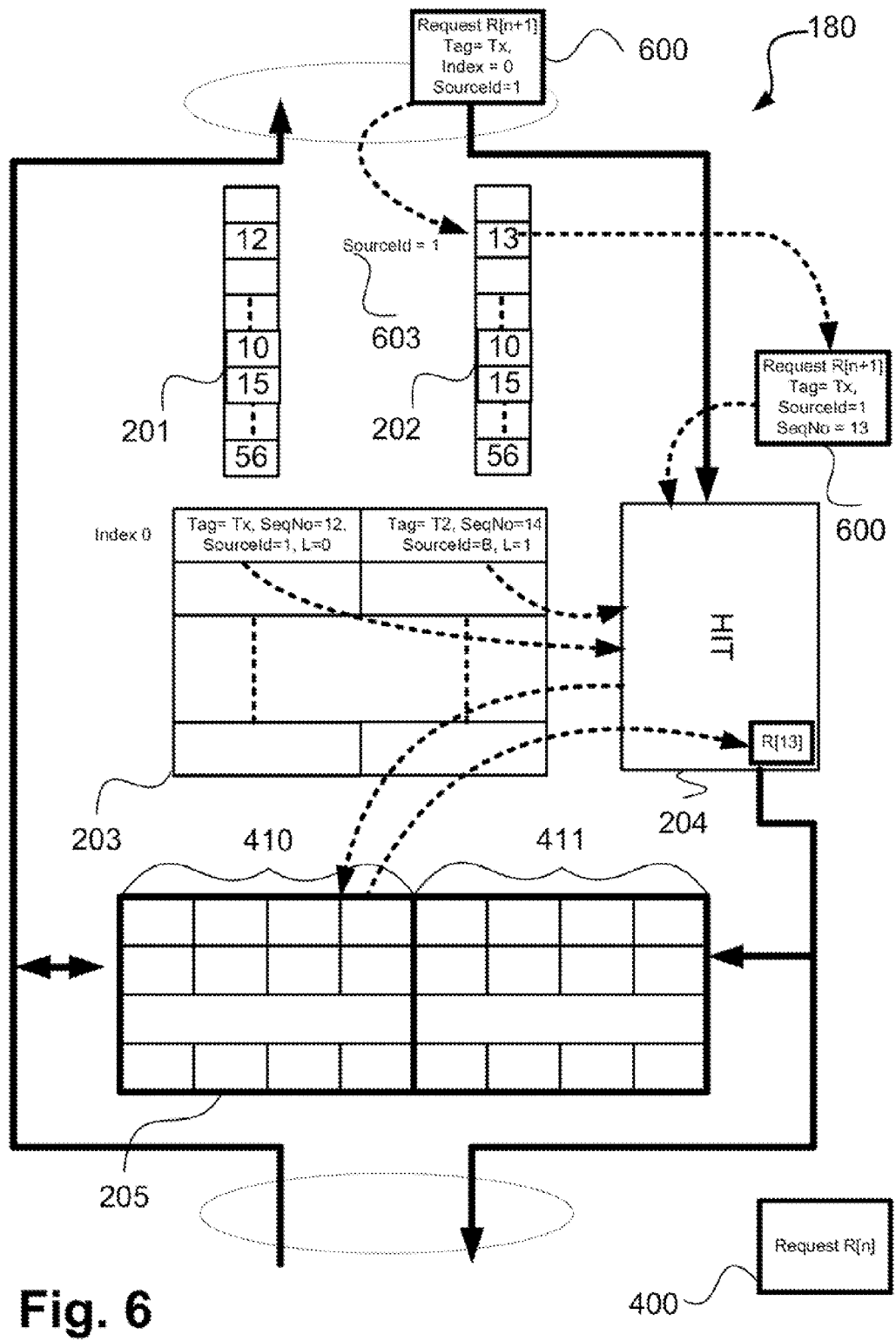
FIG. 6 is a schematic block diagram showing the cache memory of FIG. 2 after a second request R[n+1] from transaction data stream R.

FIG. 6 shows the cache memory 180 annotated to illustrate processing of a second request 600, R[n+1], from transaction data stream R following the request 400. The request 600 has the same tag value (i.e., Tag=Tx) as the request 400 in FIG. 4. Therefore, the request 600 is attempting to access the same cache line (i.e., cache line 410) as request R[n] 400. However, the cache line (i.e., cache line 410) has not yet been filled from memory 106 and/or the hard disk drive 110. Request R[n] 400 is still "in-flight". Therefore, request R[n+1] 600 hits in the cache memory 180, but a response cannot be issued. As a response cannot be issued, the request R[n+1] 600 is stored in the cache controller 204 as response R[13] for later processing.

Figure 7:
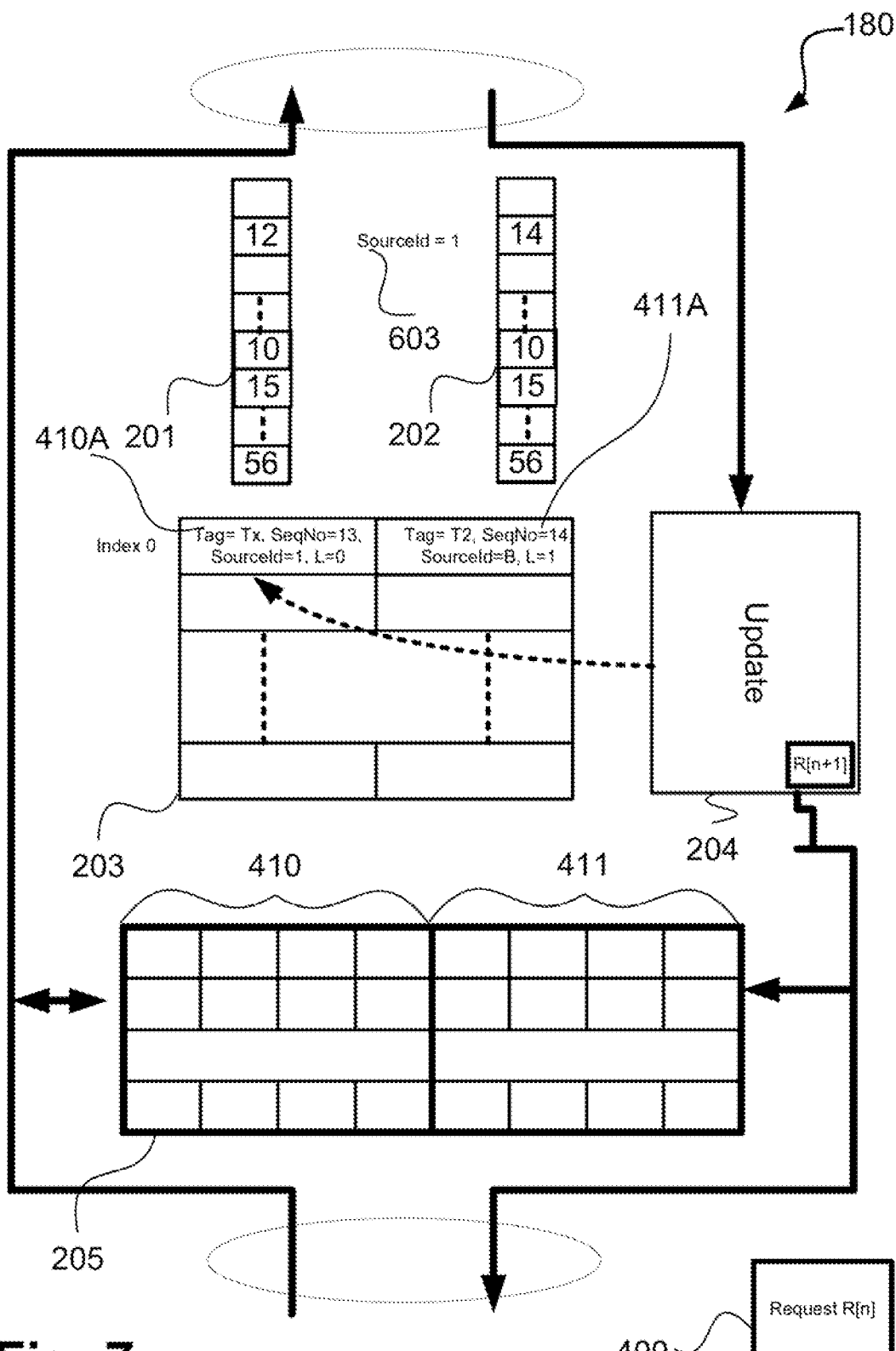
FIG. 7 is a schematic block diagram showing the cache memory of FIG. 2 after request R[n+1] of FIG. 6 has been stored in cache controller of the cache memory.

FIG. 7 shows the state of the cache memory 180 after the request R[n+1] 600 has been stored in the cache controller 204. As seen at 603 of FIG. 7, the request sequence number corresponding to the SourceID of request R[n+1] 600 (i.e., SourceID=1) has been incremented from thirteen (13) to fourteen (14). The sequence number in the status data element 410A of the registry 203 corresponding to the accessed cache line (i.e., cache line 410) has also been incremented from twelve (12) to thirteen (13) as seen in FIG. 7.

Figure 8:
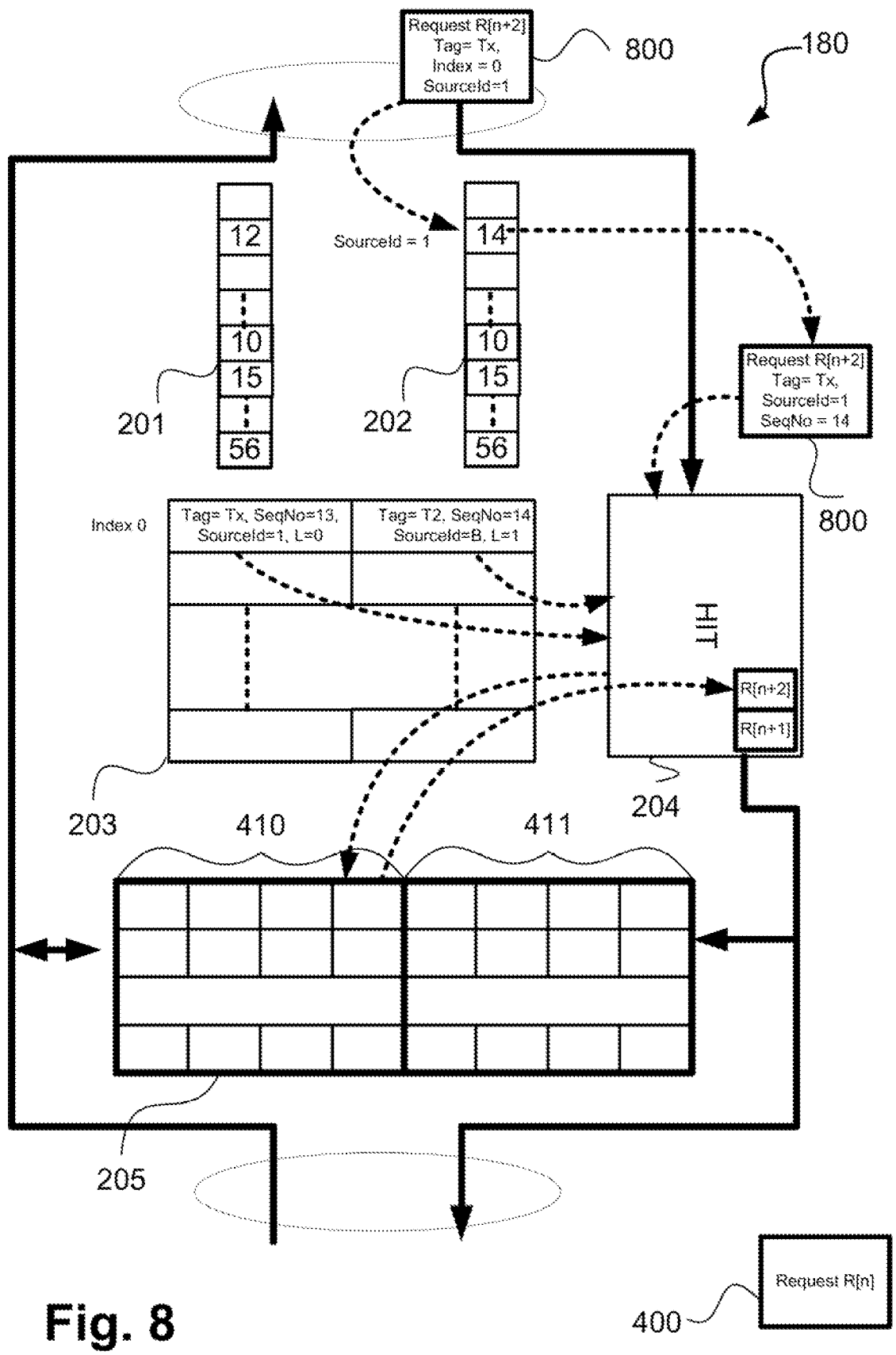
FIG. 8 is a schematic block diagram showing the cache memory of FIG. 2 after a third request R[n+2] from transaction data stream R has been stored in the cache controller.

FIG. 8 shows the cache memory 180 annotated to illustrate processing of a third request 800, R[n+2]. The request 800 also has the same tag value, Tx, as the previous two requests 400, 600. Again, the request 800 is attempting to access the same cache line (i.e., cache line 410) as the request R[n] 400. Since the cache line 410 has not been filled from main memory (i.e., memory 106 and/or the hard drive 110), the request R[n+2] 800 is also stored in the cache controller 204, as shown in FIG. 8, for later processing.

Figure 9:
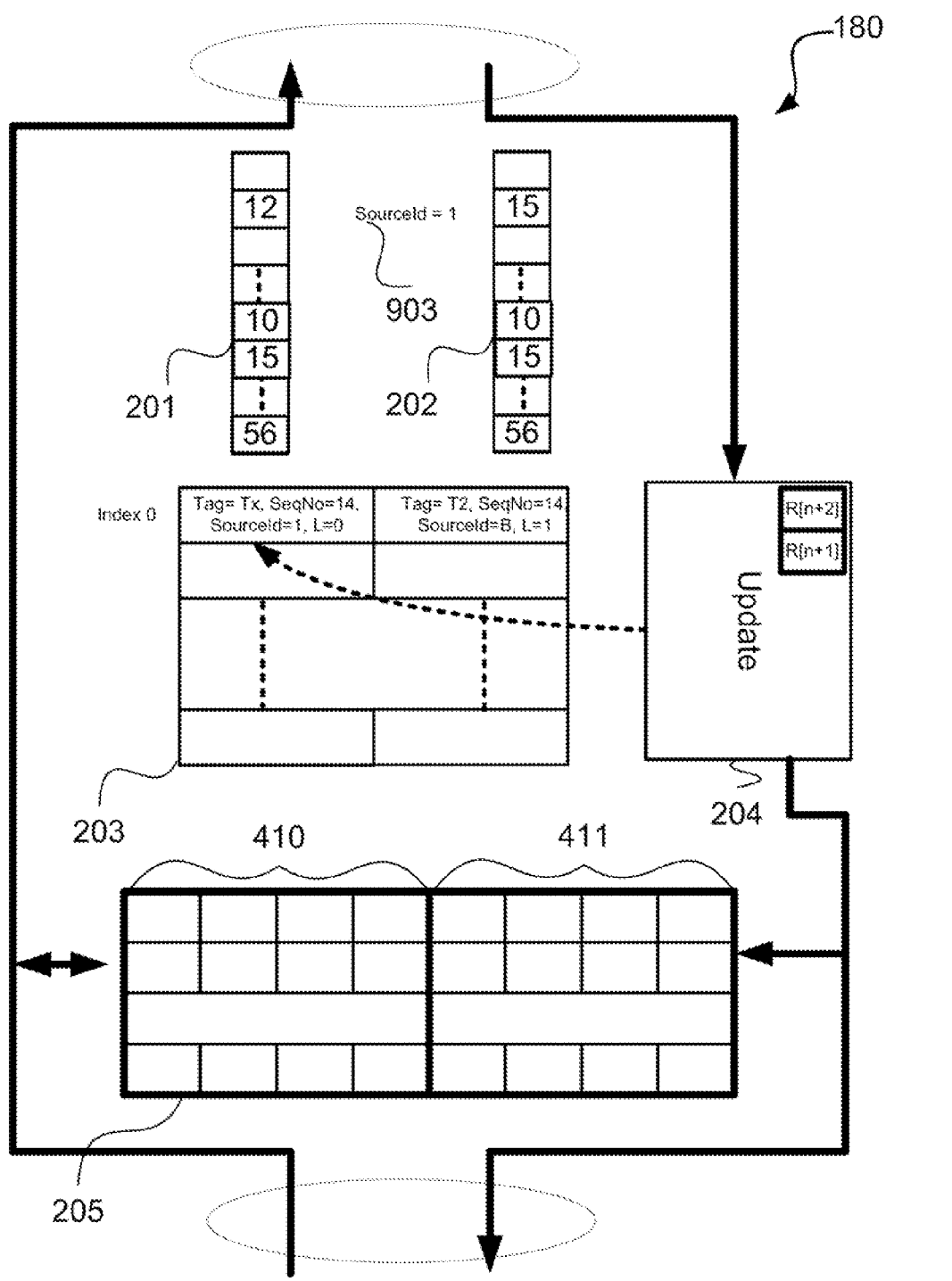
FIG. 9 is a schematic block diagram showing the state of the cache memory of FIG. 2 after request R[n+2] has been stored in the cache controller.

FIG. 9 shows the cache memory 180 after request R[n+2] 800 has been stored in the cache controller 204. Again, as shown at 903 of FIG. 9, the request sequence number corresponding to transaction data stream R identified by SourceID (i.e., SourceID=1) has been incremented as has the sequence number (i.e., SeqNo=14) in status element 410A of the registry 203 corresponding to the accessed cache line 410.

Figure 10:
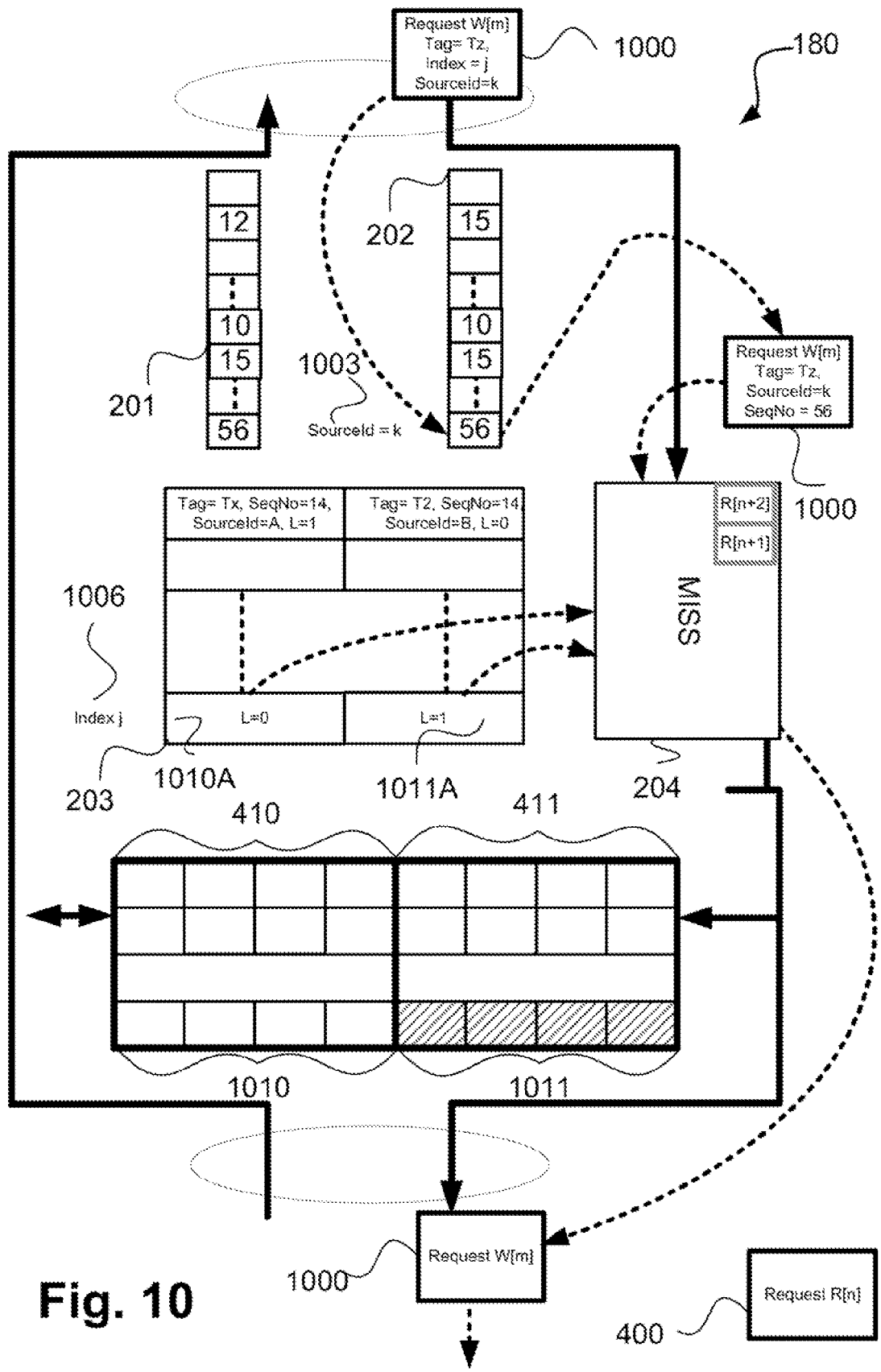
FIG. 10 is a schematic block diagram showing the cache memory of FIG. 2 after another request W[m] from a new transaction stream W.

FIG. 10 shows the cache memory 180 annotated to illustrate processing of another request 1000 from another transaction data stream W. As seen at 1003 of FIG. 10, the SourceID of request W[m] 1000 indexes a last entry in the request sequence number array 202 which returns a value fifty six (56). The sequence number (SeqNo.=56) is attached to the request 1000. As seen at 1006, the cache index (i.e., Index j) for request W[m] 1000 indexes the last set of status elements 1010A and 1011A in the registry 203. The status elements 1010A and 1011A correspond, respectively, to cache lines 1010 and 1011 in the cache line array 205. Both cache lines 1010 and 1011 in the set are not allocated therefore, request W[m] 1000 is a cache miss. Finally, the request 1000 is issued to fetch the requested data from main memory.

Figure 11:
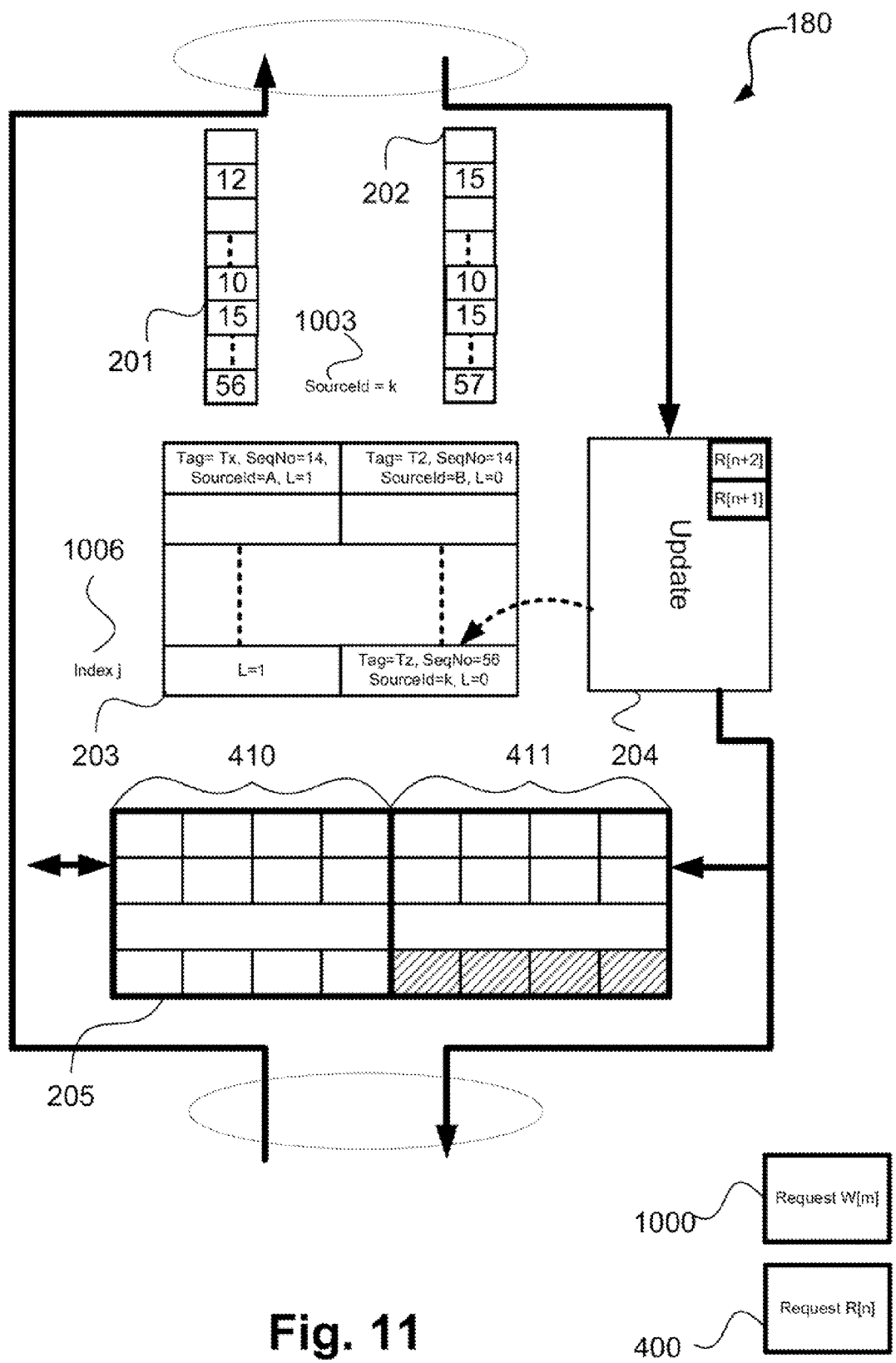
FIG. 11 is a schematic block diagram showing the state of the cache memory after request W[m] has been issued to main memory.

FIG. 11 shows the state of the cache memory 180 after the request W[m] 1000 has been issued to main memory (i.e., the memory 106 and/or hard disk drive 110). As seen in FIG. 11, the registry 203 has been loaded with status data relating to the request W[m] 1000. Further, as seen at 1003, the request sequence number (i.e., SeqNo=56) corresponding to the SourceID of the request W[m] 1000 (i.e., SourceID=k) has been incremented in the request sequence number array 202.

Figure 12:
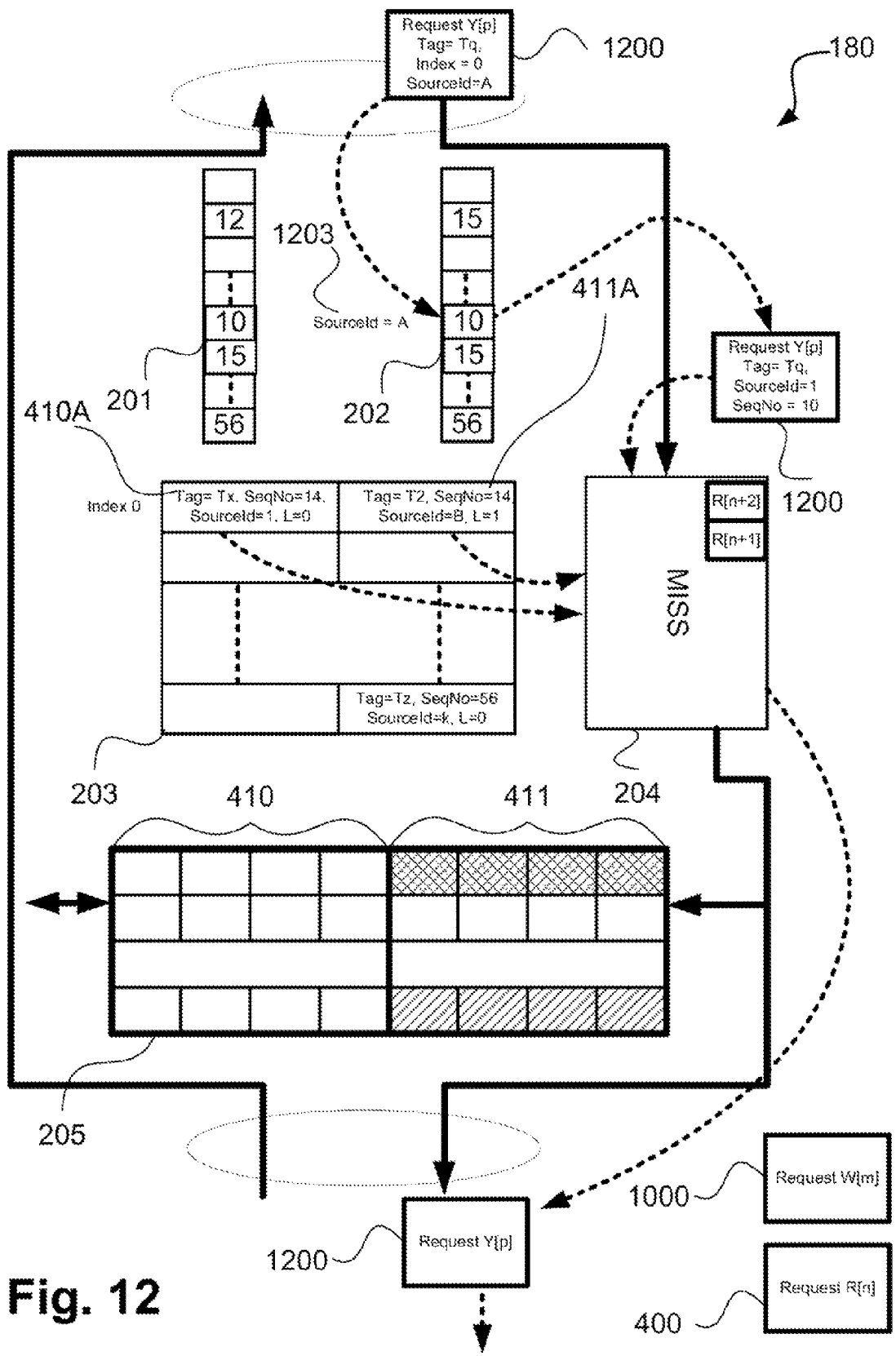
FIG. 12 is a schematic block diagram showing the cache memory of FIG. 2 after another request Y[p] from transaction data stream Y.

FIG. 12 shows the cache memory 180 annotated to illustrate processing of another request 1200 from another transaction data stream Y. As seen at 1203, the SourceID of the request Y[p] 1200 (i.e., SourceID=A) indexes entry A in the request sequence number array 202 which returns the value ten (10). The sequence number value ten (10) is attached to the request 1200 as seen in FIG. 12. As in the example described in FIG. 4, neither tag Tx or T2 held in status data elements 410A and 411A, respectively, of the registry 203 matches tag, Tq, of the request 1200. Therefore, the request 1200 is a cache miss.

Both cache lines (i.e., cache line 410 and cache line 411) are allocated and therefore, one of the cache lines 410 or 411 needs to be evicted (or victimised). The status element 410A corresponding to the first cache line 410 in the set contains a sequence number of fourteen (14) (i.e., SeqNo=14). Indexing into the response sequence number array 201 using the SourceID of the first cache line 410 (i.e., SourceID=1) returns a sequence number value of twelve (12). The sequence number, twelve (12), from the response sequence number array 201 is compared with the sequence number of the first cache line (i.e., SeqNo=14), which is fourteen (14) in the example of FIG. 12, as shown in status element 410A. The sequence number of the first cache line 410 is not less than the corresponding sequence number in the response sequence number array 202. As such, the first cache line 410 in the set is non-replaceable. The status data element 411A of the registry 203 corresponding to the second cache line 411 in the set contains a sequence number of fifteen (15) (i.e., SeqNo=15).

Indexing into the response sequence number array 201 using the SourceID of the second cache line 411 (i.e., SourceID=B) returns a sequence number value of fifteen (15). The sequence number, fifteen (15), from the response sequence number array 201 is compared with the sequence number value (i.e., SeqNo=14) as shown in status element 411A, in the example of FIG. 12. Thus, the sequence number of the second cache line 411 is less than the corresponding sequence number in the response sequence number array 201. Therefore, the cache line 411 is identified as the "victim" cache line. The sequence number and the transaction data stream identifying label of the request 1200 are therefore assigned to the victim cache line 411. Finally, the request 1200 is issued to fetch the requested data from the main memory.

Figure 13:
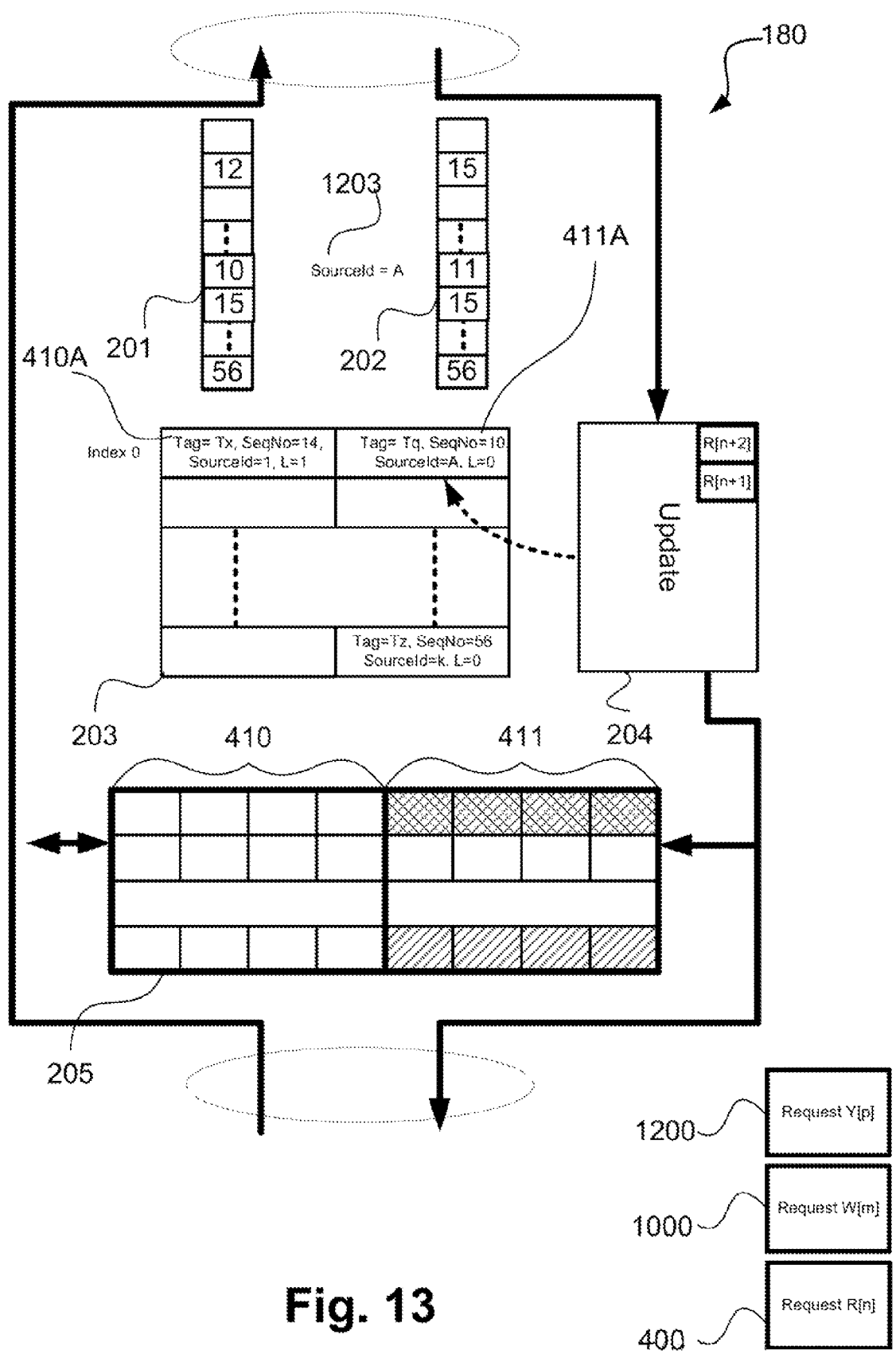
FIG. 13 is a schematic block diagram showing the state of the cache memory after request Y[p] has been issued to main memory.

FIG. 13 shows the state of the cache memory 180 after request Y[p] 1200 has been issued to main memory (i.e., the memory 106 and/or hard disk drive 110). As seen in FIG. 13, the status data element 411A of the registry 203, corresponding to the second cache line 411, has been loaded with status data relating to request Y[p] 1200. As seen at 1203, the request sequence number corresponding to the SourceID (i.e., SourceID=A) of the request Y[p] 1200 has been incremented to eleven (11) in the request sequence number array 202.

Figure 14:
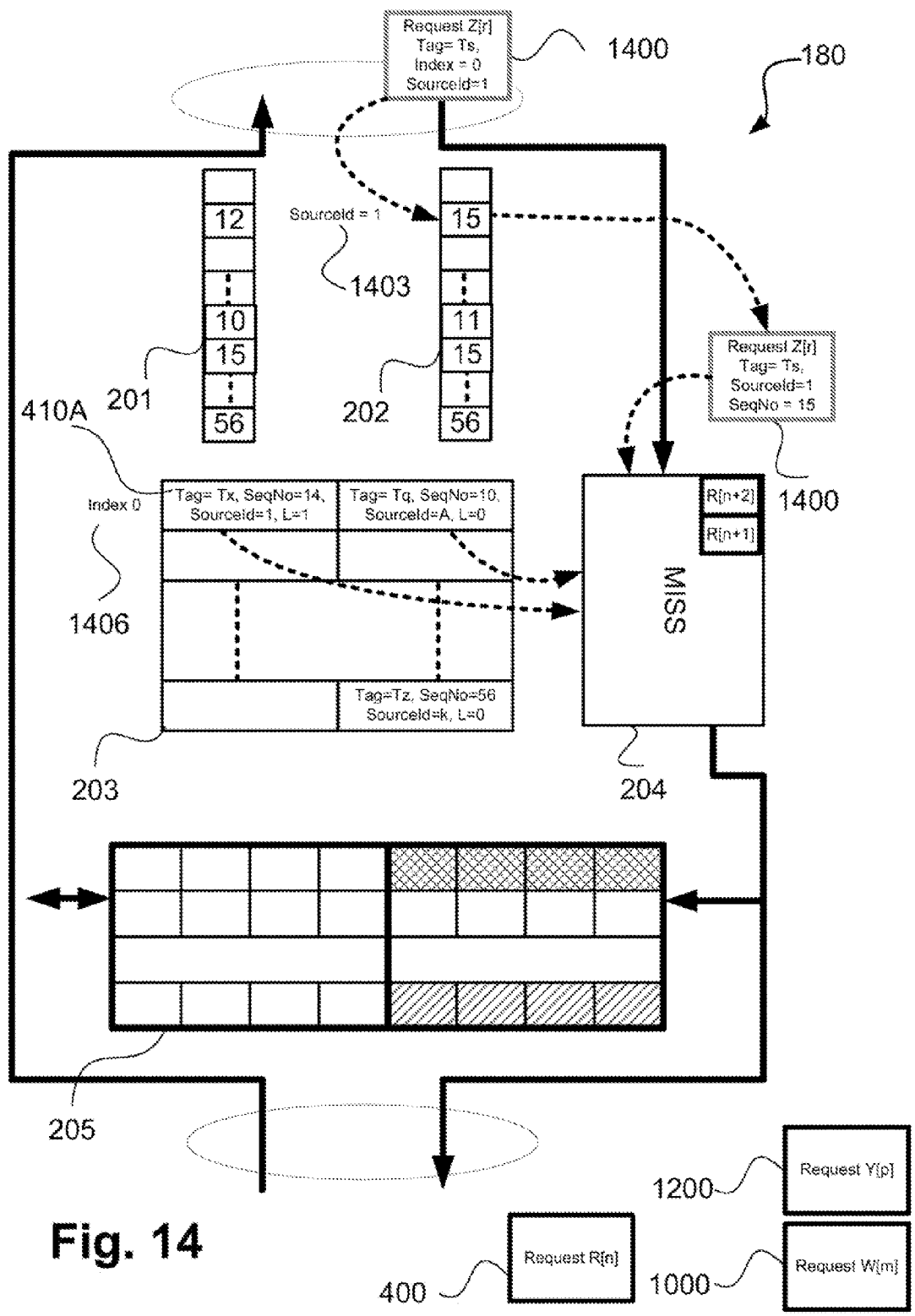
FIG. 14 is a schematic block diagram showing the cache memory of FIG. 2 after a request from transaction data stream Z.

FIG. 14 shows the cache memory ISO annotated to illustrate processing of another request 1400 from transaction data stream Z. As seen at 1403, SourceID of request Z[r] 1400 indexes entry one (1) in the request sequence number array 202 which returns value fifteen (15). The sequence number (i.e., SeqNo.=15) is attached to the request 1400 as seen in FIG. 14. As in the example described in FIGS. 4 and 12, neither tag Tx or Tq held in the registry 203 matches the tag (i.e., Tag=Ts) of the request Ts 1400. Therefore, again, the request 1400 is a cache miss.

Again, in the example of FIG. 14, both cache lines 410 and 411 are allocated and therefore, one of the cache lines 410 and 411 needs to be evicted. However, the status element 410A of the first cache line 410 in the set contains a sequence number of fourteen (14) (i.e., SeqNo.=14). Indexing into the response sequence number array 201 using the transaction stream identifying label or SourceID of the status data element 410A of the first cache line 410 returns a sequence number value of twelve (12) as seen in the response sequence number array 201. The number twelve (12) from the response sequence number array 201 is compared with the sequence number value for the first cache line 410, which is fourteen (14) in the example of FIG. 14. That is, the sequence number of the first cache line 410 is not less than the corresponding sequence number in the response sequence number array 201. This condition renders the first cache line 410 in the set non-replaceable. The status data element 411A corresponding to the second cache line 411 in the set contains a sequence number of ten (10). Indexing into the response sequence number array 201 using the SourceID (i.e., SourceID=A) in the status element 411A corresponding to the second cache line 411 returns a sequence number value of eleven (11). That is, the sequence number (i.e., eleven (11)) of the second cache line 411 is also not less than the corresponding sequence number (i.e., ten (10)) in the response sequence number array 201. This condition renders both cache lines 410 and 411 in the set non-replaceable. Therefore, the request Y[p] 1400 cannot be processed at this time and the cache memory 180 needs to stall. In the examples described with reference to FIGS. 2 to 19, the cache memory 180 is two-way associative. By increasing the associativity of the cache 180, the number of cache lines per set is increased and the frequency of the stall condition may be reduced.

Figure 15:
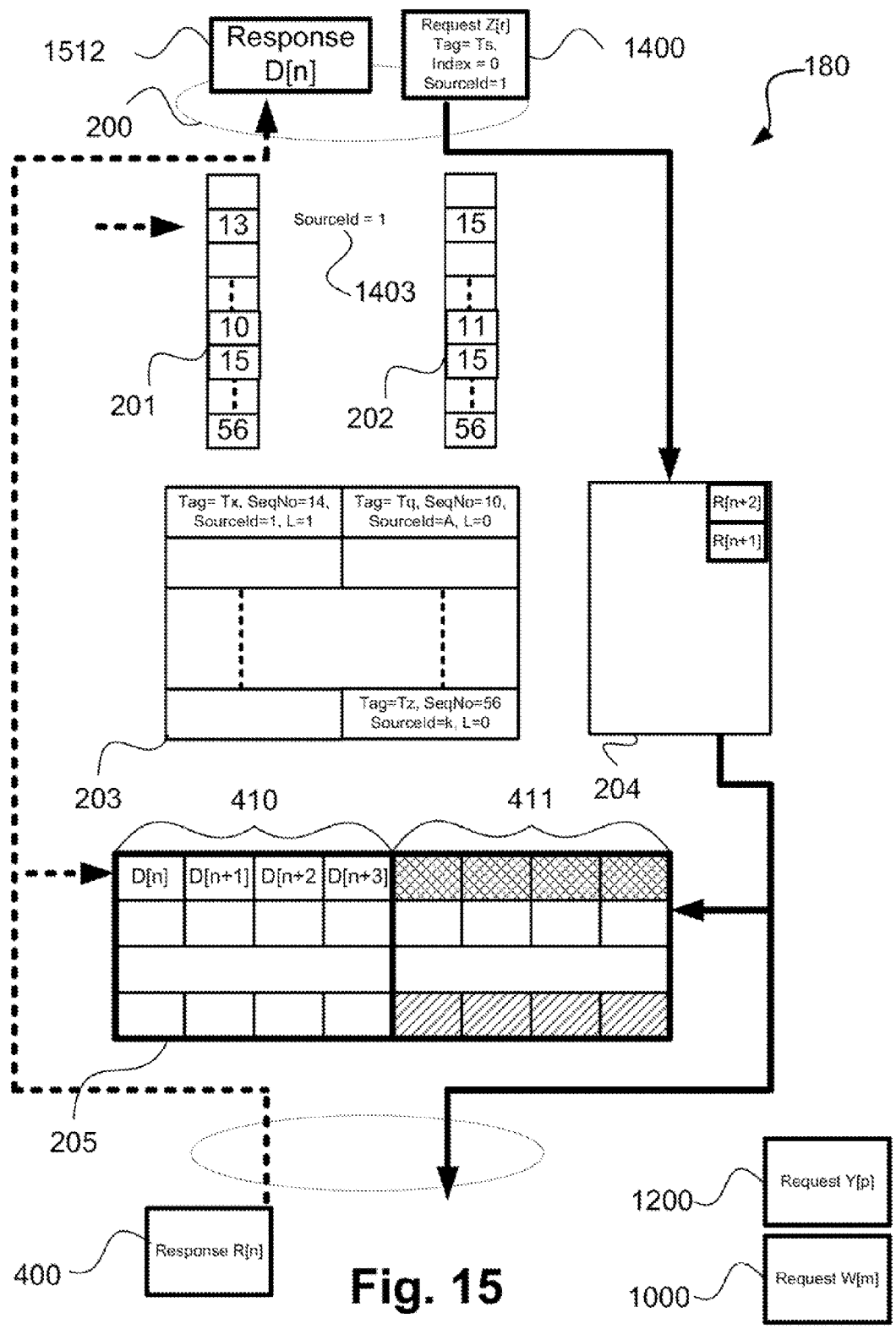
FIG. 15 is a schematic block diagram showing a response received on the main memory interface of the cache memory of FIG. 4.

FIG. 15 shows the response 400 received on the main memory interface 206 associated with the miss (MISS) example described above with reference to FIG. 4. In the example of FIG. 15, the first cache line 410 in the first set in the cache line array 205 is filled, and a response 1512 is sent via the request/response interface 200. As seen at 1403, the response sequence number array 201 is also updated by incrementing the sequence number indexed by the SourceID associated with the cache line 410 in the registry 203 from twelve (12) to thirteen (13). In the example of FIG. 15, the request Z[r] 1400 remains stalled since no cache lines in the set are yet available.

Figure 16:
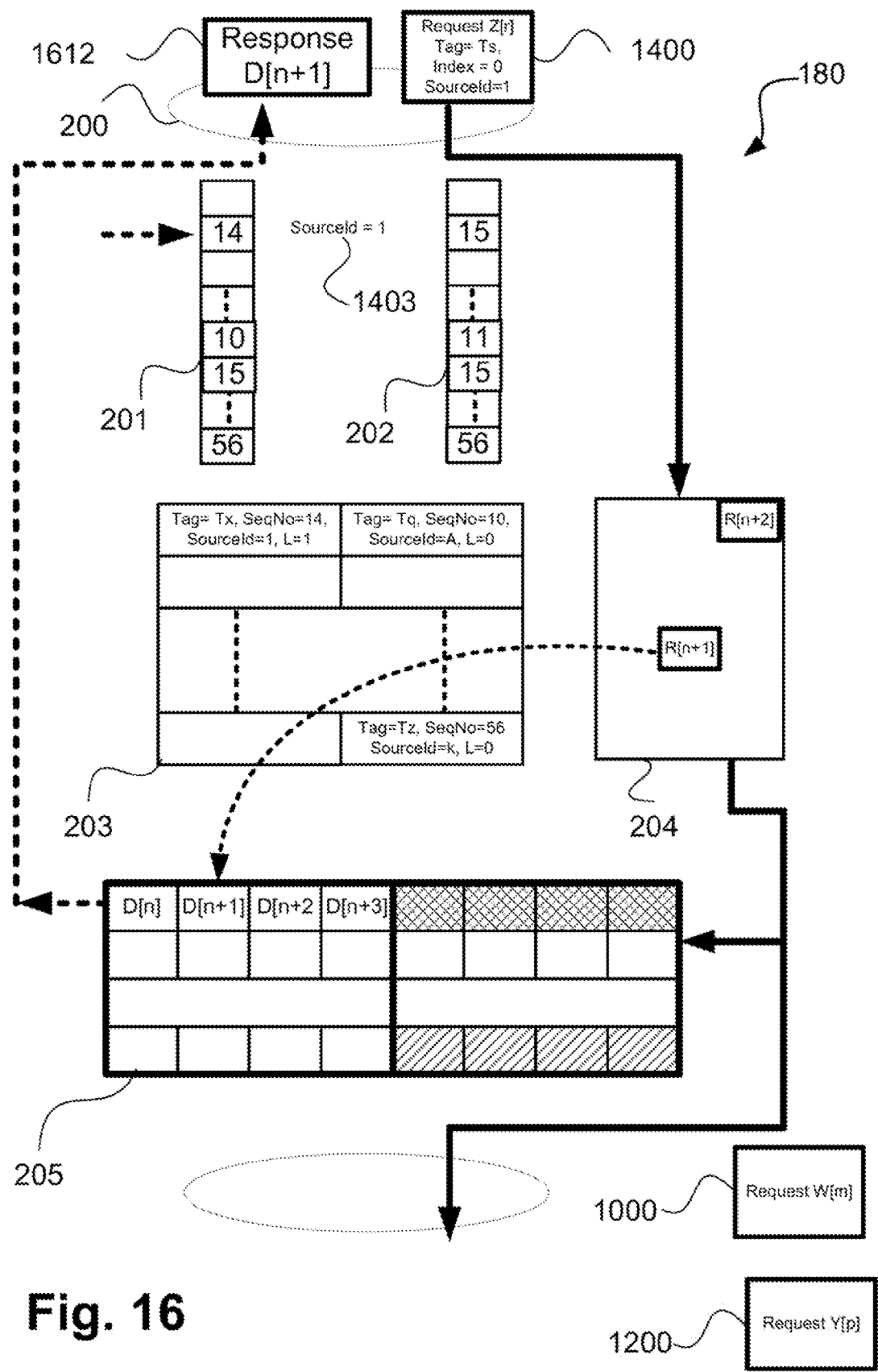
FIG. 16 is a schematic block diagram showing the cache memory of FIG. 2 during processing of request R[n+1]

Continuing the example of FIG. 15, having filled their associated cache line, requests R[n+1] 600 and 800 can now be processed as seen in FIG. 16. Request R[n+1] 600 is processed first and a response D[n+1] 1612 is sent to the request/response interface 200. The response sequence number array 201 is also further updated by incrementing the sequence number indexed by the SourceID, as seen at 1403, associated with the status element 410A in the registry 203 from thirteen (13) to fourteen (14). The request Z[r] 1400 remains stalled since no cache lines in the set are yet available.

Figure 17:
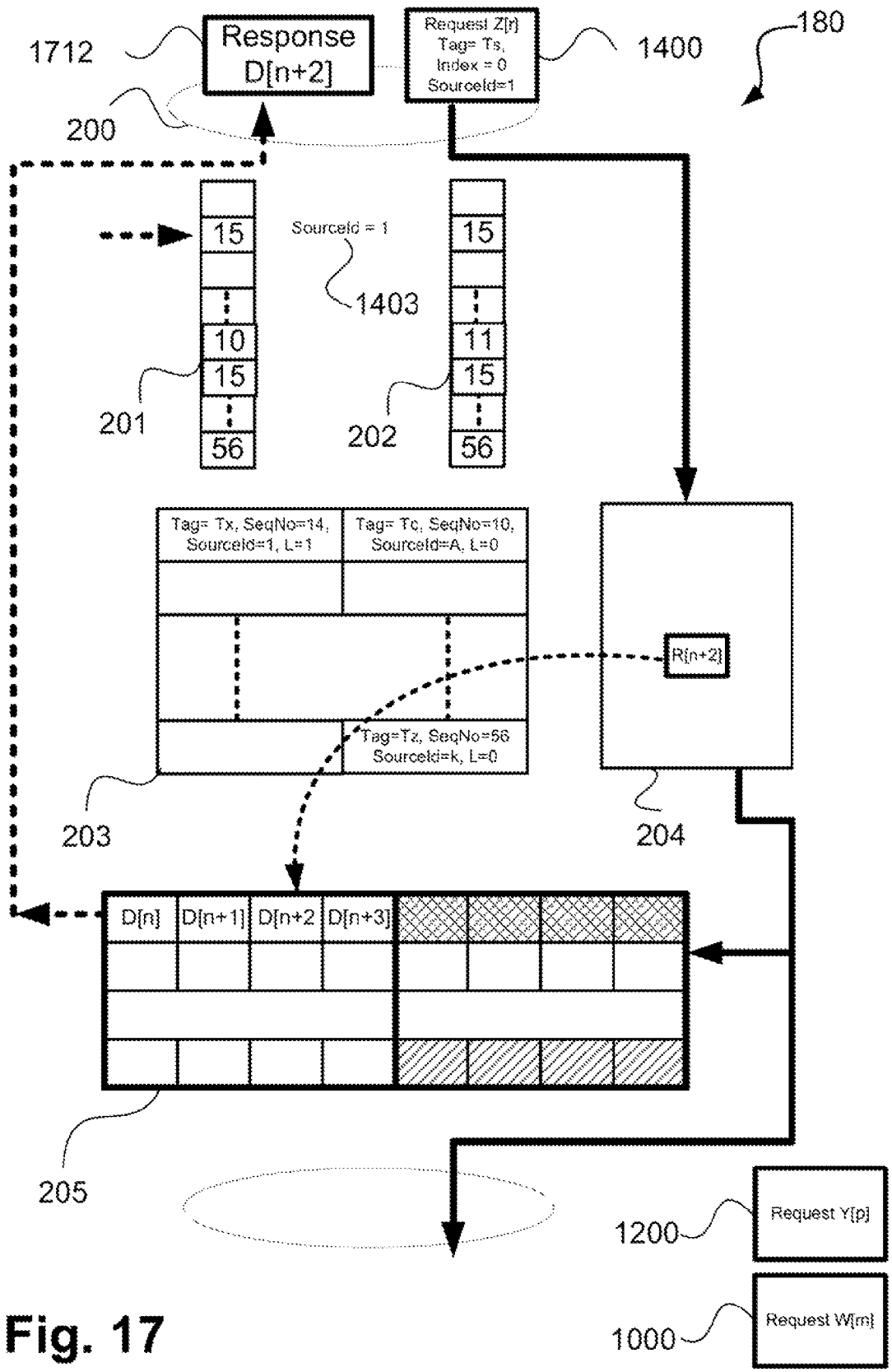
FIG. 17 is a schematic block diagram showing the cache memory of FIG. 2 after processing of request R[n+2] where a response is sent to the request/response interface.

Continuing the example of FIG. 15, as seen in FIG. 17, request R[n+2] 1800 is subsequently processed and a response 1712 is sent to the request/response interface 200. The response sequence number array 201 is, again, further updated by incrementing the sequence number indexed by the SourceID, as seen at 1403, associated with the cache line 410 in the registry 203 from fourteen (14) to fifteen (15). Note that the sequence number (i.e., SeqNo=14) in the cache line status data element 410A of the registry 203 is now less than the corresponding sequence number in the response sequence number array 201. Therefore, the first cache line 410 in the first set of cache lines is now available for replacement. The sequence number and the transaction data stream identifying label of the request 800 are then assigned to the victim cache line 410.

Figure 18:
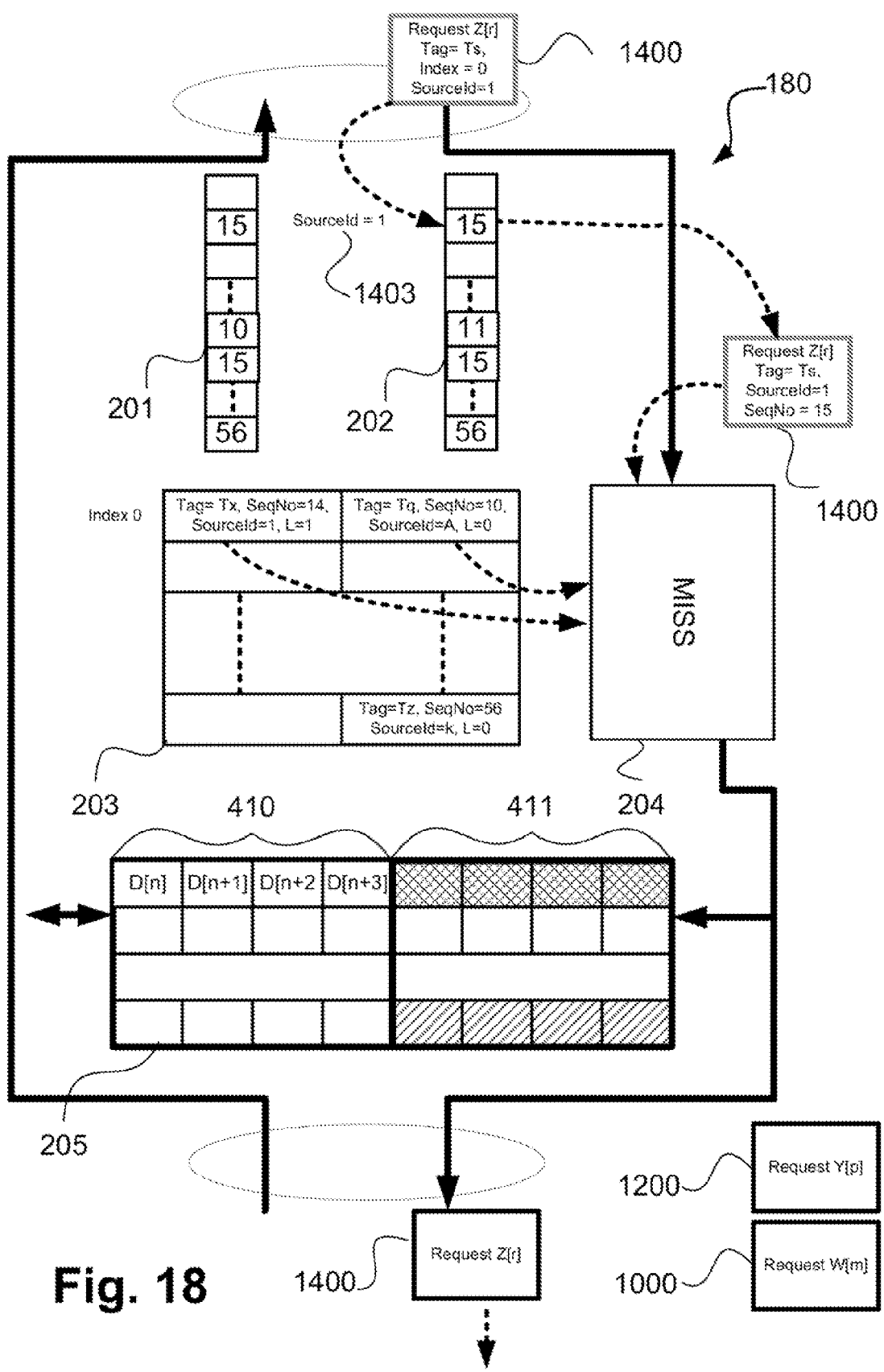
FIG. 18 is a schematic block diagram showing the cache memory of FIG. 2 during processing of request Z[r]

FIG. 18 shows the cache memory 180 during processing of request Z[r] 1400. In FIG. 18, the cache line 410 is available to process the request Z[r] 1400. The victim cache line is identified as the first cache line 410 corresponding to the status element 410A in the first set of the registry 203.

Figure 19:
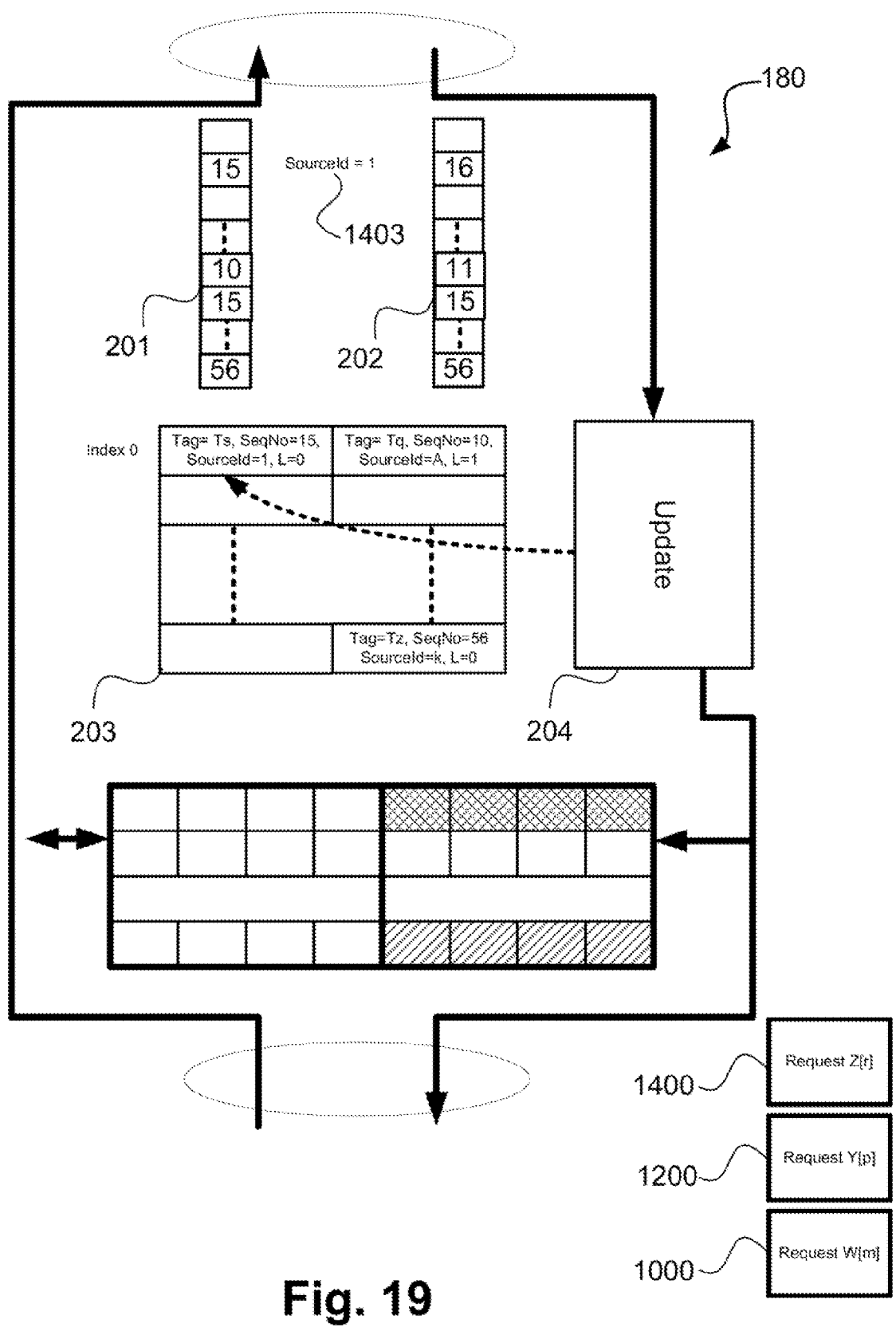
FIG. 19 is a schematic block diagram showing the cache memory of FIG. 2 after dispatching the request Z[r]

FIG. 19 shows the state of the cache memory 180 after dispatching the request Z[r] 1400 to main memory (i.e., the memory 106 and/or the hard disk drive 110). As seen in FIG. 19, the status element 410A of the registry 203, corresponding to the first cache line 410, has been loaded with status data relating to request Z[r] 1400. As seen at 1403 of FIG. 18, the request sequence number corresponding to the SourceID (i.e., SourceID=1) of the request Z[r] 1400 has been incremented to sixteen (16) in the request sequence number array 202.

Figure 20:
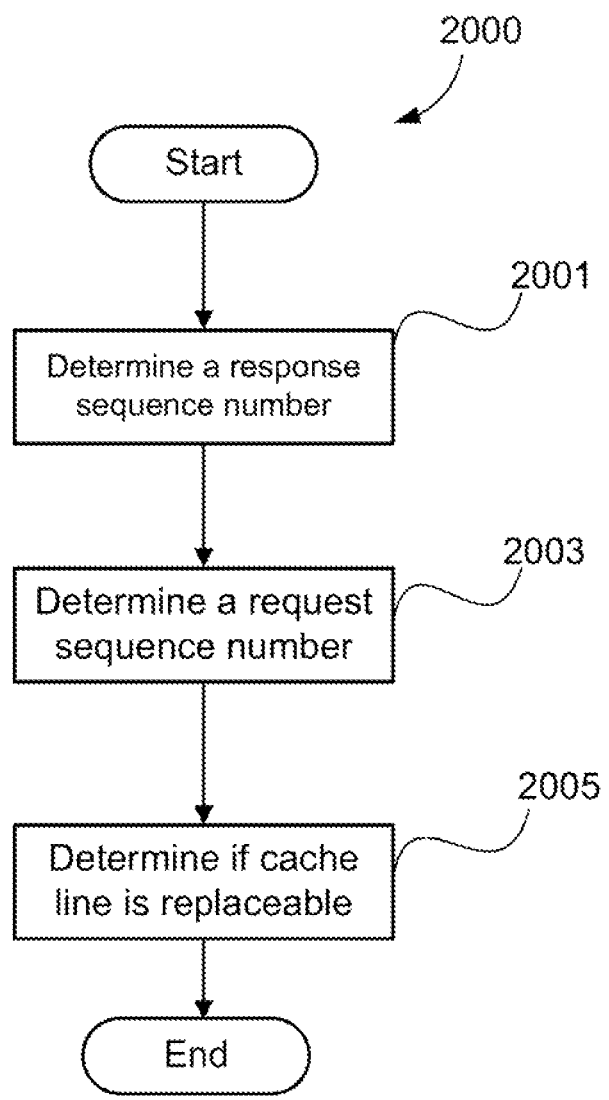
FIG. 20 is a flow diagram showing a method of determining if a cache line is replaceable.

A method 2000 of determining if a cache line is replaceable, will now be described with reference to FIG. 20. The method 2000 may be implemented as software resident on the hard disk drive 110 and being controlled in its execution by the cache controller 204. As described above, the cache controller 204 may be under execution of one or more of the processors 105A, 10513 and/or 105C. The method 2000 will be described with reference to the cache memory 180 of FIG. 2.

The method 2000 begins at determining step 2001, where the cache controller 204 determines a response sequence number by indexing the response sequence number array 201 with a SourceID, stored in a status element (e.g., 410A) of the registry 203, corresponding to a candidate cache line.

At the next step 2003, the cache controller 204 determines a request sequence number by indexing the request sequence number array 202 with the SourceID, stored in a status element of the registry 203, corresponding to a candidate cache line.

Then at the next step 2005, the cache controller 204 performs the step of determining if the cache line is replaceable by comparing the response sequence number with the request sequence number. If the response sequence number and the request sequence number have equal values, then the cache line is determined to be replaceable. However, if the response sequence number and the request sequence number do not have equal values, then the cache line is determined to be not replaceable.

Figure 21:
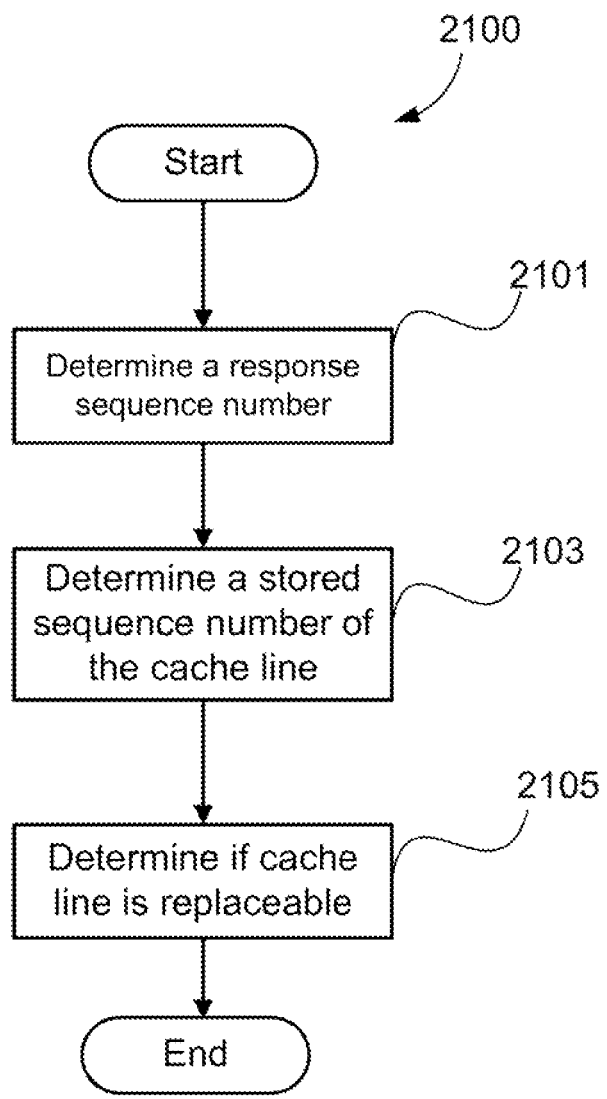
FIG. 21 is a flow diagram showing another method of determining if a cache line is replaceable.

A method 2100 of determining if a cache line is replaceable, will now be described with reference to FIG. 21. The method 2100 may be implemented as software resident on the hard disk drive 110 and being controlled in its execution by the cache controller 204. As described above, the cache controller 204 may be under execution of one or more of the processors 105A, 105B and/or 105C. The method 2100 will be described with reference to the cache memory 180 of FIG. 2.

The method 2100 begins at determining step 2101, where the cache controller 204 determines a response sequence number by indexing the response sequence number array 201 with a SourceID, stored in a status element (e.g., 410A) of the registry 203, corresponding to a candidate cache line.

At the next determining step 2103, the cache controller 204 determines the stored sequence number of the candidate cache line. Then, at step 2105, the cache controller 204 compares the stored sequence number and the indexed response sequence number to determine if the cache line is replaceable. The cache line is replaceable if the stored sequence number is less than the index response sequence number.

INDUSTRIAL APPLICABILITY

The arrangements described are applicable to the computer and data processing industries and particularly for the data processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of allocating a cache line of a cache memory, said method comprising:

assigning a request sequence number in a request sequence number register to a request received from a first process executed by a processor, the request sequence number register being associated with the first process;

identifying a candidate victim cache line in the cache memory using data from the received request, the candidate victim cache line being associated with a second process having no outstanding unprocessed requests, the candidate victim cache line corresponding to a request sequence number of a most recently processed request which accessed the candidate victim cache line;

receiving, from a response sequence number register associated with the second process, a response sequence number characterising the number of fulfilled requests associated with said second process, the response sequence number in the response sequence number register being incremented in response to returning transaction data requested by at least one request associated with said second process;

selecting the candidate victim cache line for eviction if the request sequence number of the most recently processed request which accessed said candidate victim cache line is less than or equal to the received response sequence number associated with the determined second process; and allocating the selected candidate victim cache line to the request received from the first process.

2. The method according to claim 1, further comprising issuing a main memory access to fetch data for the identified candidate victim cache line.

3. An apparatus for allocating a cache line of a cache memory, said apparatus comprising:
- means for assigning a request sequence number in a request sequence number register to a request received from a first process executed by a processor, the request sequence number register being associated with the first process;
- means for identifying a candidate victim cache line in the cache memory using data from the received request, the candidate victim cache line being associated with a second process having no outstanding unprocessed requests, the candidate victim cache line corresponding to a request sequence number of a most recently processed request which accessed the candidate victim cache line;
- means for receiving, from a response sequence number register associated with the second process, a response sequence number characterising the number of fulfilled requests associated with said second process, the response sequence number in the response sequence number register being incremented in response to returning transaction data requested by at least one request associated with said second process;
- means for selecting the candidate victim cache line for eviction if the request sequence number of the most recently processed request which accessed said candidate victim cache line is less than or equal to the received response sequence number associated with the determined second process; and
- means for allocating the selected candidate victim cache line to the request received from the first process.

4. A system for allocating a cache line of a cache memory, said system comprising:
- a memory storing data and a computer program; and
- a processor coupled to said memory for executing said computer program, said computer program comprising instructions for:
  - assigning a request sequence number in a request sequence number register to a request received from a first process executed by a processor, the request sequence number register being associated with the first process;
  - identifying a candidate victim cache line in the cache memory using data from the received request, the candidate victim cache line being associated with a second process having no outstanding unprocessed requests, the candidate victim cache line corresponding to a request sequence number of a most recently processed request which accessed the candidate victim cache line;
  - receiving, from a response sequence number register associated with the second process, a response sequence number characterising the number of fulfilled requests associated with said second process, the response sequence number in the response sequence number register being incremented in response to returning transaction data requested by at least one request associated with said second process;
  - selecting the candidate victim cache line for eviction if the request sequence number of the most recently processed request which accessed said candidate victim cache line is less than or equal to the received response sequence number associated with the determined second process; and
  - allocating the selected candidate victim cache line to the request received from the first process.

5. A non-transitory computer readable medium having a computer program recorded thereon for allocating a cache line of a cache memory, said program comprising:
- code for assigning a request sequence number in a request sequence number register to a request received from a first process executed by a processor, the request sequence number register being associated with the first process;
- code for identifying a candidate victim cache line in the cache memory using data from the received request, the candidate victim cache line being associated with a second process having no outstanding unprocessed requests, the candidate victim cache line corresponding to a request sequence number of a most recently processed request which accessed the candidate victim cache line;
- code for receiving, from a response sequence number register associated with the second process, a response sequence number characterising the number of fulfilled requests associated with said second process, the response sequence number in the response sequence number register being incremented in response to returning transaction data requested by at least one request associated with said second process;
- code for selecting the candidate victim cache line for eviction if the request sequence number of the most recently processed request which accessed said candidate victim cache line is less than or equal to the received response sequence number associated with the determined second process; and
- code for allocating the selected candidate victim cache line to the request received from the first process.

6. The method according to claim 1, wherein allocating the selected candidate victim cache line to the request received from the first process further comprises evicting the selected candidate victim cache line from the cache memory.

7. The apparatus according to claim 3, wherein the means for allocating comprises means for evicting the selected candidate victim cache line from the cache memory.

8. The system according to claim 4, further comprising means for evicting the selected candidate victim cache line from the cache memory.

9. The non-transitory computer readable medium according to claim 5, wherein the code for allocating comprises code for evicting the selected candidate victim cache line from the cache memory.

10. A method of allocating a cache line of a cache memory shared by a plurality of processes, said method comprising:
- receiving a request from a first process to allocate a cache line of the cache memory;
- determining a candidate victim cache line for eviction, to fulfil the received request, using data from the received request;
- determining a second process which accessed the determined candidate victim cache line; and
- identifying a most recently fulfilled request associated with the second process;
- selecting the determined candidate victim cache line for eviction if an identifier of a most recent request which accessed the determined candidate victim cache line is less than or equal to an identifier of the most recently fulfilled request associated with the second process; and allocating the selected candidate victim cache line to the request received from the first process.

\* \* \* \* \*